(12) United States Patent
Song et al.

(10) Patent No.: US 7,826,308 B2
(45) Date of Patent: Nov. 2, 2010

(54) METHOD FOR OPTIMAL DESIGN OF NON-UNIFORM WEIGHTED PERIODIC SPARSE ARRAYS FOR ULTRASOUND IMAGING SYSTEM

(75) Inventors: Tai-Kyong Song, Seoul (KR); Gi-Duck Kim, Incheon (KR)

(73) Assignee: Industry-University Cooperation Foundation Sogang University, Seoul (KR)

( * ) Notice: Subject to any disclaimer, the term of this patent is extended or adjusted under 35 U.S.C. 154(b) by 71 days.

(21) Appl. No.: 12/292,225

(22) Filed: Nov. 14, 2008

(65) Prior Publication Data

US 2009/0281775 A1 Nov. 12, 2009

(30) Foreign Application Priority Data

May 7, 2008 (KR) .................. 10-2008-0042543

(51) Int. Cl.
*G01S 15/00* (2006.01)
*A61B 8/00* (2006.01)
(52) U.S. Cl. ...................................... 367/87; 600/447
(58) Field of Classification Search ................. 367/87; 342/372, 373
See application file for complete search history.

(56) References Cited

U.S. PATENT DOCUMENTS 5,537,367 A * 7/1996 Lockwood et al. ............ 367/87
6,783,497 B2 * 8/2004 Grenon et al. ............... 600/459

OTHER PUBLICATIONS

Lockwood et al, "Optimizing Sparse Two-Dimensional Transducer Arrays Using an Effective Aperture Approach", 1994 Ultrasonics Symposium, pp. 1497-1501.*
Nikolov et al., "Application of Differential Spatial Sampling Patterns for Sparse Array Transducer Design", Ultrasonics, {Ultrasonics-Netherlands}, Jul. 2000, vol. 37, No. 10, p. 667-71, 5 refs, CODEN: ULTRA3, ISSN: 0041-624X. Publisher: Elsevier, Netherlands.*

* cited by examiner

*Primary Examiner*—Ian J Lobo
(74) *Attorney, Agent, or Firm*—The Nath Law Group; Jerald L. Meyer; Robert T. Burns

(57) ABSTRACT

Disclosed herein is a method for the optimal design of an apodization function used for non-uniform weighted periodic sparse arrays for an ultrasound imaging system. The method includes the steps of (a) setting the interval $P_T$ of a transmit sparse array and the number $L_T$ of array elements within the interval $P_T$ so that common grating lobes are not generated in the beam patterns of the transmit sparse array and a receive sparse array; (b) setting the interval $P_R$ of the receive sparse array and the number $L_R$ of array elements within the interval $P_R$ so that common grating lobes are not generated in the beam patterns of the transmit sparse array and the receive sparse array; (c) setting a transmit apodization function WT(n) configured to be applied to the beam pattern of the transmit sparse array; and (d) setting a receive apodization function WR(n) configured to be applied to the beam pattern of the receive sparse array.

9 Claims, 18 Drawing Sheets

FIG. 4

| LOCATION OF SIDE LOBE | LEVEL |
|---|---|
| FIRST | −13.1dB |
| SECOND | −17.7dB |
| THIRD | −20.6dB |
| FOURTH | −22.8dB |
| FIFTH | −24.5dB |
| SIXTH | −25.9dB |
| SEVENTH | −27.1dB |
| EIGHTH | −28.2dB |
| NINTH | −29.1dB |
| TENTH | −29.9dB |
| ELEVENTH | −32.8dB |

METHOD FOR OPTIMAL DESIGN OF NON-UNIFORM WEIGHTED PERIODIC SPARSE ARRAYS FOR ULTRASOUND IMAGING SYSTEM

CROSS-REFERENCE TO RELATED PATENT APPLICATION

This application claims the benefit of Korean Patent Application No. 10-2008-0042543, filed on May 7, 2008, in the Korean Intellectual Property Office, the disclosure of which is incorporated herein in its entirety by reference.

BACKGROUND OF THE INVENTION

1. Field of the Invention

The present invention relates generally to an ultrasound imaging system, and, more particularly, to a method for the optimal design of an apodization function used for non-uniform weighted periodic sparse arrays for an ultrasound imaging system.

2. Description of the Related Art

An ultrasound imaging system converts electric signals into ultrasonic waves using an ultrasound transducer (for example, a piezoelectric transducer), sends the ultrasonic waves, receives ultrasonic signals reflected from a target object, converts the ultrasonic signals into electric signals, signal-processes the electric signals into images, and transmits the resulting images to a user. A Brightness (B)-mode image, which is a basic ultrasound image, represents clinical information about a section of a human body. The quality of the B-mode image depends on performance such as resolution, signal-to-noise ratio and frame rate.

In a current ultrasound system in which an array transducer composed of array elements is used as an ultrasound transducer, the distance between the array elements is determined based on the wavelength of a transmission signal and then the number of array elements used, that is, the number of channels, is determined to be suitable for the size of a desired aperture. Meanwhile, focusing on desired image points is achieved by applying electrical variable time delay to each channel.

In the present specification, a typical array using all array elements within the size of an aperture is referred to as a Fully Sampled Array (hereinafter referred to as an 'FSA'). A typical ultrasound system using FSAs is configured to increase the size of an aperture, that is, the number of channels, so as to obtain higher resolution and employs a high performance focusing technique such as dynamic focusing. Here, since each channel includes an ultrasound transmission/reception circuit and a time delay calculator for focusing, the complexity of the hardware of an ultrasound system increases in proportion to the number of channels. A one-dimensional array transducer for providing second-dimensional sectional images, which is widely used, currently has 64~256 channels, the number of which is gradually increasing. In the case where a two-dimensional array transducer for providing three-dimensional images is composed of 64 channels in the lateral direction and 64 channels in the elevation direction, a total of 4096 channels are required, so that the size of hardware is increased 64 times that of the one-dimensional array transducer that uses 64 channels.

In order to solve this problem, various techniques for reducing the complexity of hardware have been proposed. Among these techniques, a sparse array technique can obtain the effect of seeming to use a large aperture using a limited number of channels, and thus it is one of the principal search issues.

A sparse array technique is a technique for reducing the number of channels while minimizing the reduction in lateral resolution by sparsely distributing the locations of array elements within an aperture required by an image using only some of the array elements. The sparse array technique is used as a technique for effectively increasing the size of an aperture for a given number of channels. Since the sparse array technique uses typical dynamic reception focusing, it has advantages in that there is no motion artifact and additional hardware is not required, unlike the extended aperture technique and the combined aperture technique. However, in the sparse array technique, the distance between array elements actually used is increasing, and thus unwanted grating lobes are generated. Accordingly, the most important aspect to be considered in the design of a sparse array is finding a method of preventing the occurrence of grating lobes or performing their suppression so as to allow the generation of only a minimum of grating lobes under given design conditions.

Among such sparse arrays, a periodic sparse array is configured to regularly distribute array elements within an aperture. A periodic sparse array has advantages in that the design thereof is very simple and the number of channels can be reduced in proportion to the period of the distribution of array elements, but has a disadvantage in that grating lobes are generated because the distance between the array elements increases in proportion to the period. Various techniques for eliminating the grating lobes of a periodic sparse array have been proposed.

Meanwhile, in an ultrasound system using typical array transducers, that is, FSAs, the level of side lobes is suppressed by applying a weight function to an aperture function, as shown in Equation 1:

$$\Psi_{N_{ch}}(u') = \sum_{n=0}^{N_{ch}-1} w(n) \cdot a_0(n) e^{j\left(2\pi d \frac{u'}{\lambda}\right)n} \quad (1)$$

where $w(n)$ is an apodization function that is applied to an aperture function, $a_0(n)$ is an aperture function that represents the weight of an n-th array element, and $N_{ch}$ is the number of channels.

Widely-used apodization functions include a hanning window function and a hamming window function. FIG. 1(a) shows a unidirectional beam pattern for a uniform weighted FSA that does not use an apodization function, and FIG. 1(b) shows a unidirectional beam pattern for a non-uniform weighted FSA that uses an apodization function as a hanning window function. From FIG. 1, it can be seen that in the case where an apodization function is used, the width of a main lobe is somewhat increased and the levels of side lobes are rapidly suppressed.

Accordingly, it can be easily expected that the application of a weight function to a uniform weighted periodic sparse array can improve the Destructive Beam Cross-interference (DBC) effect. Accordingly, in the present invention, a periodic sparse array to which an apodization function is applied is referred to as a 'non-uniform weighted periodic sparse'. However, the non-uniform weighted periodic sparse array using a typical apodization function has problems in that the width of the main lobe thereof is greater than that of the uniform weighted periodic sparse array, the Signal-to-Noise Ratio (SNR) thereof is degraded because the amplitude of a signal is decreased after the focusing of a beam, and the complexity of the system is increased because the transmission and reception circuit thereof requires additional hardware.

In order to resolve the above problems, various methods of designing a non-uniform weighted sparse array have been proposed. The most popularized method of designing a non-uniform weighted sparse array includes a method using an optimization algorithm, such as a genetic algorithm, so as to optimize a final beam pattern. This approach has an advantage in that an optimal apodization function can be designed for a certain sparse array and it is difficult to implement actual hardware because an apodization function has a complex function form.

Furthermore, another non-uniform weighted sparse array design method for suppressing grating lobes is a method of regarding grating lobes as noise and designing the apodization function of a sparse array based on the concept of a filter for eliminating the noise. This case has an advantage in that an apodization function can be configured in a simple structure because designing is performed using a signal processing technique. However, in the case where an apodization function is designed based on such a concept of a filter, the orders of a filter should be limited because the size of the aperture of an array transducer, that is, the number of array elements, is limited. Accordingly, there may occur the cases where an apodization function designed based on the concept of a filter does not acquire desired performance for a given sparse array.

Meanwhile, a non-uniform weighted sparse array may be designed using the effective aperture concept, which is a design method for a Vernier array. The method using the effective aperture concept is a method of designing an apodization function so that an effective aperture obtained in the case where the apodization function is applied to a given sparse array is similar to the effective aperture of an FSA, compared to that in the contrary case. Since in this method, an effective aperture is defined as the convolution of a transmission/reception aperture function, the effective aperture of a given sparse array can be optimized using one of various signal processing techniques. However, since this method is not an analytic approach, like the design method for a uniform weighted periodic sparse array, it is impossible to find the conditions of an optimal apodization function for a certain periodic sparse array from the point of view of the cancellation of grating lobes.

Accordingly, in the present invention, there is proposed a method for the optimal design of a non-uniform weighted periodic sparse array that enables the design of a weight function capable of optimizing a final beam pattern by effectively suppressing other excessive grating lobes than common grating lobes for a periodic sparse array.

SUMMARY OF THE INVENTION

Accordingly, the present invention has been made keeping in mind the above problems occurring in the prior art, and an object of the present invention is to provide a method for the design of a non-uniform weighted periodic sparse array capable of effectively suppressing excessive grating lobes other than the common grating lobes of transmit and receive sparse arrays, thereby optimizing the final beam pattern of periodic sparse arrays.

In order to accomplish the above object, the present invention provides a method for optimal design of non-uniform weighted periodic sparse arrays for an ultrasound imaging system, the ultrasound imaging system having an array transducer including a total of N elements, the method including the steps of (a) setting the interval $P_T$ of a transmit sparse array and the number $L_T$ of array elements within the interval $P_T$ so that common grating lobes are not generated in the beam patterns of the transmit sparse array and a receive sparse array; (b) setting the interval $P_R$ of the receive sparse array and the number $L_R$ of array elements within the interval $P_R$ so that common grating lobes are not generated in the beam patterns of the transmit sparse array and the receive sparse array; (c) setting a transmit apodization function $WT(n)$ configured to be applied to the beam pattern of the transmit sparse array; and (d) setting a receive apodization function $WR(n)$ configured to be applied to the beam pattern of the receive sparse array.

Preferably, the step (c) includes (c1) acquiring an aperture function $a_0(j_T)$ of a uniform weighted Full Sampled Array (FSA) including a number of array elements equal to $J_T$; (c2) acquiring an aperture function $h_0(P_R)$ of an FSA including a number of array elements equal to the interval $P_R$ of the receive sparse array; (c3) acquiring a weight function $w_{PT}(n)$ by convoluting the aperture function $a_0(j_T)$ with the aperture function $h_0(P_R)$ and then up-sampling a result of the convolution $P_T$ times; (c4) acquiring an aperture function $h_0(L_T)$ of an FSA including a number of array elements equal to a number $L_T$ of elements used in the transmit sparse array; and (c5) convoluting the weight function $w_{PT}(n)$ with the aperture function $h_0(L_T)$; wherein $J_T$ is a greatest integer equal to or less than a value obtained by dividing a total number N of elements of the array transducer by the interval $P_T$ of the transmit sparse array, and determines the transmit apodization function $W_T(n)$.

Preferably, the method includes (d1) acquiring an aperture function $a_0(j_R)$ of a uniform weighted FSA including a number of array elements equal to $J_R$; (d2) acquiring an aperture function $h_0(P_T)$ of an FSA including a number of array elements equal to the interval $P_T$ of the receive sparse array; (d3) acquiring a weight function $w_{PR}(n)$ by convoluting the aperture function $a_0(j_R)$ with the aperture function $h_0(P_T)$ and then up-sampling a result of the convolution $P_R$ times; (d4) acquiring an aperture function $h_0(L_R)$ of an FSA including a number of array elements equal to a number $L_R$ of elements used in the receive sparse array; and (d5) convoluting the weight function $w_{PR}(n)$ with the aperture function $h_0(L_R)$; wherein $J_R$ is a greatest integer equal to or less than a value obtained by dividing a total number N of elements of the array transducer by the interval $P_R$ of the receive sparse array, and determines the transmit apodization function $W_R(n)$.

Preferably, the method includes (c1) acquiring an aperture function $a_0(j_T)$ of a uniform weighted FSA including a number of array elements equal to $J_T$; (c2) acquiring an aperture function $h_0(n \times P_R)$ of an FSA including a number of array elements equal to a multiple $n \times P_R$ of the interval $P_R$ of the receive sparse array; (c3) acquiring a weight function $w_{PT}(n)$ by convoluting the aperture function $a_0(j_T)$ with the aperture function $h_0(n \times P_R)$ and then up-sampling a result of the convolution $P_T$ times; (c4) acquiring an aperture function $h_0(L_T)$ of an FSA including a number of array elements equal to a number $L_T$ of elements used in the transmit sparse array; and (c5) convoluting the weight function $w_{PT}(n)$ with the aperture function $h_0(L_T)$; wherein $J_T$ is a greatest integer equal to or less than a value obtained by dividing a total number N of elements of the array transducer by the interval $P_T$ of the transmit sparse array, and determines the transmit apodization function $W_T(n)$.

Preferably, the method includes (d1) acquiring an aperture function $a_0(j_R)$ of a uniform weighted FSA including a number of array elements equal to $J_R$; (d2) acquiring an aperture function $h_0(m \times P_T)$ of an FSA including a number of array elements equal to a multiple $m \times P_T$ of the interval $P_T$ of the receive sparse array; (d3) acquiring a weight function $w_{PR}(n)$ by convoluting the aperture function $a_0(j_R)$ with the aperture function $h_0(m \times P_T)$ and then up-sampling a result of the convolution $P_R$ times; (d4) acquiring an aperture function $h_0(L_R)$ of an FSA including a number of array elements equal to a number $L_R$ of elements used in the receive sparse array; and (d5) convoluting the weight function $w_{PR}(n)$ with the aperture function $h_0(L_R)$; wherein $J_R$ is a greatest integer equal to or less than a value obtained by dividing a total number N of elements of the array transducer by the interval $P_R$ of the receive sparse array, and determines the transmit apodization function $W_R(n)$.

Preferably, the steps (a) and (b) include setting $P_T$ and $L_T$ of the transmit sparse array and $P_R$ and $L_R$ of the receive sparse array so that the interval $P_T$ of the transmit sparse array is not equal to the interval $P_R$ of the receive sparse array and the intervals $P_T$ and $P_R$ are coprime integers, the steps (a) and (b) include setting $P_T$ and $L_T$ of the transmit sparse array and $P_R$ and $L_R$ of the receive sparse array so that the interval $P_T$ of the transmit sparse array is not equal to the interval $P_R$ of the receive sparse array, $P_T > P_R$, and $L_R = P_R$, or the steps (a) and (b) include setting $P_T$ and $L_T$ of the transmit sparse array and $P_R$ and $L_R$ of the receive sparse array so that the interval $P_T$ of the transmit sparse array is not equal to the interval $P_R$ of the receive sparse array, the intervals $P_T$ and $P_R$ are not coprime, and $L_T$ or $L_R$ is a greatest common divisor of $P_T$ and $P_R$.

BRIEF DESCRIPTION OF THE DRAWINGS

The above and other objects, features and advantages of the present invention will be more clearly understood from the following detailed description taken in conjunction with the accompanying drawings, in which:

FIG. 1 shows unidirectional beam patterns for non-uniform weighted FSAs, wherein

FIG. 3 shows unidirectional continuous wave beam patterns that are used to analyze the differences in the lateral beam pattern between an FSA and a sparse array, wherein

FIG. 4 is a table in which the obtained levels of respective side lobes of a principal beam pattern are listed;

FIG. 12 shows graphs illustrating the aperture functions and effective apertures of non-uniform weighted periodic sparse arrays according to the present invention, wherein

FIG. 13 shows graphs illustrating the aperture functions and effective apertures of non-uniform weighted periodic sparse arrays according to the present invention, wherein

FIG. 14 shows graphs illustrating the continuous wave beam patterns of the non-uniform weighted periodic sparse arrays according to the present invention, wherein

FIG. 15 shows graphs illustrating the aperture functions and effective apertures of the non-uniform weighted periodic sparse arrays in the cases where SFs are increased twice according to the present invention, FIG. 16 shows graphs illustrating the continuous wave beam patterns of the non-uniform weighted periodic sparse arrays in the cases, the SFs of which are increased twice according to the present invention, wherein

DESCRIPTION OF THE PREFERRED EMBODIMENTS

Figure 1A:
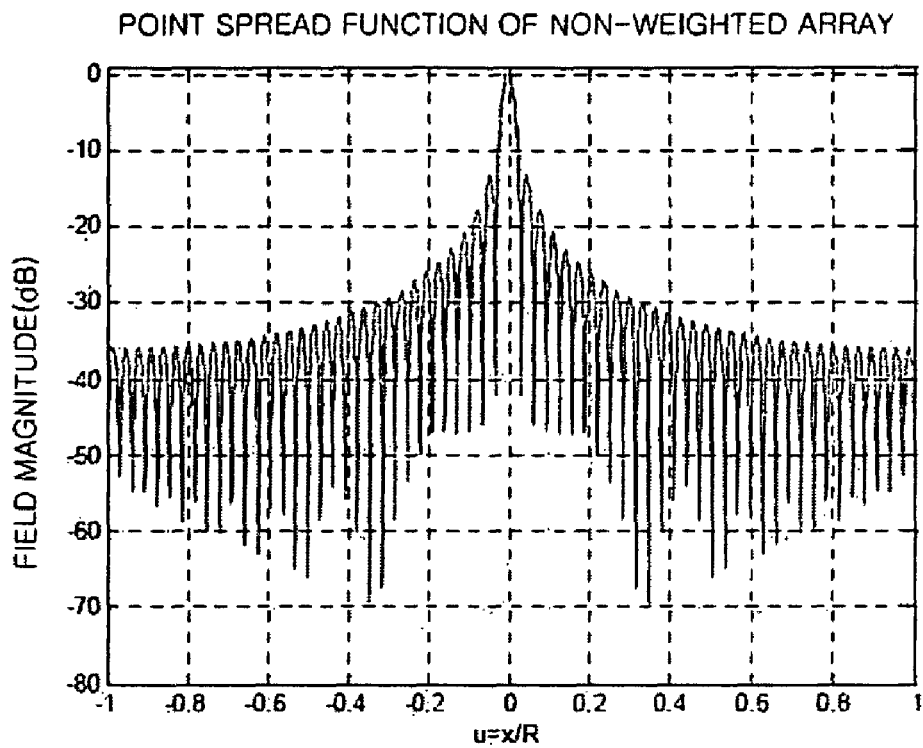
FIG. 1(a) shows a unidirectional beam pattern for a uniform weighted FSA that does not use an apodization function.
Figure 1B:
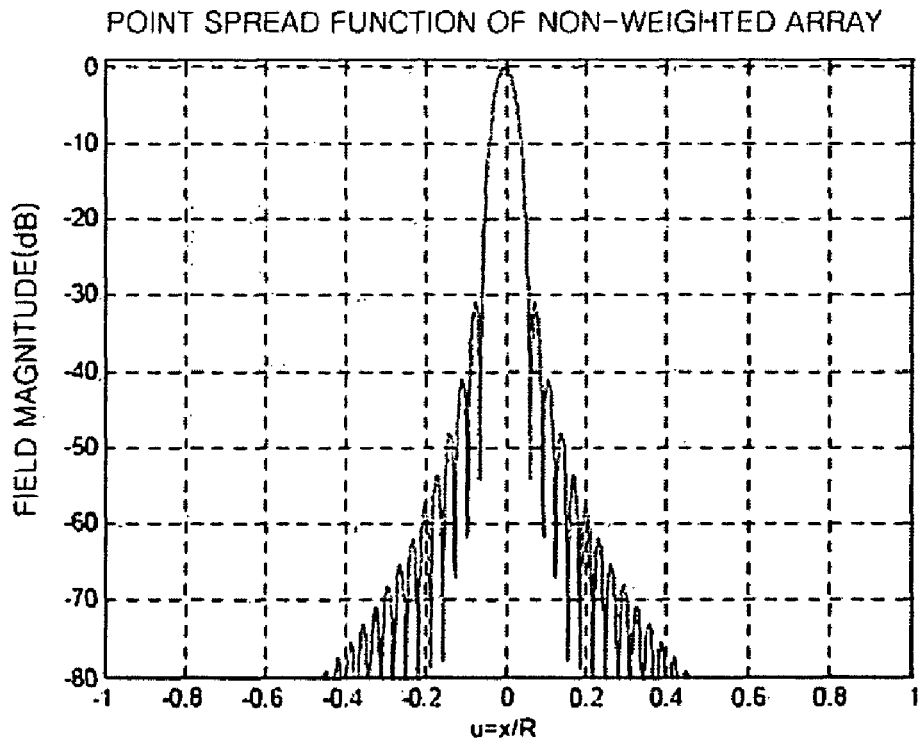
FIG. 1(b) shows a unidirectional beam pattern for a non-uniform weighted FSA that uses an apodization function as a hanning window function.

Reference now should be made to the drawings, in which the same reference numerals are used throughout the different drawings to designate the same or similar components.

A method for the optimal design of a non-uniform weighted periodic sparse array according to preferred embodiments of the present invention will be described in detail below with reference to the accompanying drawings.

Establishment of General Model

Figure 2:
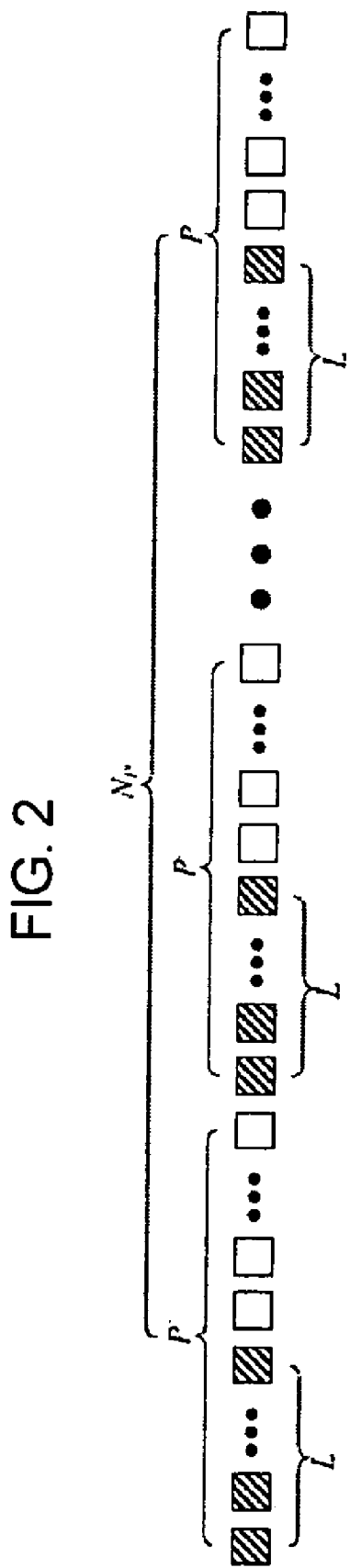
FIG. 2 is a diagram showing a general model for a uniform weighted periodic sparse array according to the present invention.

First, in order to analyze a periodic sparse array according to a preferred embodiment of the present invention, a general model for a periodic sparse array is established. FIG. 2 is a diagram showing a general model for a periodic sparse array according to the present invention. Here, actually used elements are indicated by hatched squares, and all have specific weights. Furthermore, the transmit sparse array and the receive sparse array are respectively represented by STA ($P_T$, $L_T$) and SRA ($P_R$, $L_R$), each of the arrays uses L consecutive elements within the period of a P-element section during ultrasound transmission and reception, $N_p$ is the number of P-element sections, the size of the total aperture is $N_p \times P$, and the number of elements actually used is $N_p \times L$.

The lateral beam pattern of the periodic sparse array of FIG. 2 in a focusing plane or a Fraunhofer region may be expressed as the following Equation 2:

$$\Psi_{P,L}(u') \approx \Phi_e(u) \cdot \sum_{n=0}^{N_p-1} \sum_{l=0}^{L-1} \exp\{-jku'(Pd+l)n\} \qquad (2)$$

$$= \Phi_e(u) \cdot \sum_{n=0}^{N_p-1} \exp(-jku'Pdn) \cdot \sum_{l=0}^{L-1} \exp(-jku'dl)$$

$$= \Phi_e(u) \cdot \Psi_P(u') \cdot W_L(u')$$

where $$\Psi_P(u') = \frac{\sin(\pi N_P P d u'/\lambda)}{\sin(\pi P d u'/\lambda)} \text{ and}$$

$$W_L(u') = \frac{\sin(\pi d L u'/\lambda)}{\sin(\pi d u'/\lambda)}.$$

Equation 2 means that L consecutive elements actually used in each period have independent time delays. Accordingly, independent time delays are applied to all elements used in the entire array. From Equation 2, it can be seen that the beam pattern of $\Psi_{P,L}(u')$ can be obtained by multiplying beam pattern $\Psi_P(u')$ of the case using a single element selected from among every P elements by the beam pattern $W_L(u')$ of an FSA using L elements.

Figure 3A:
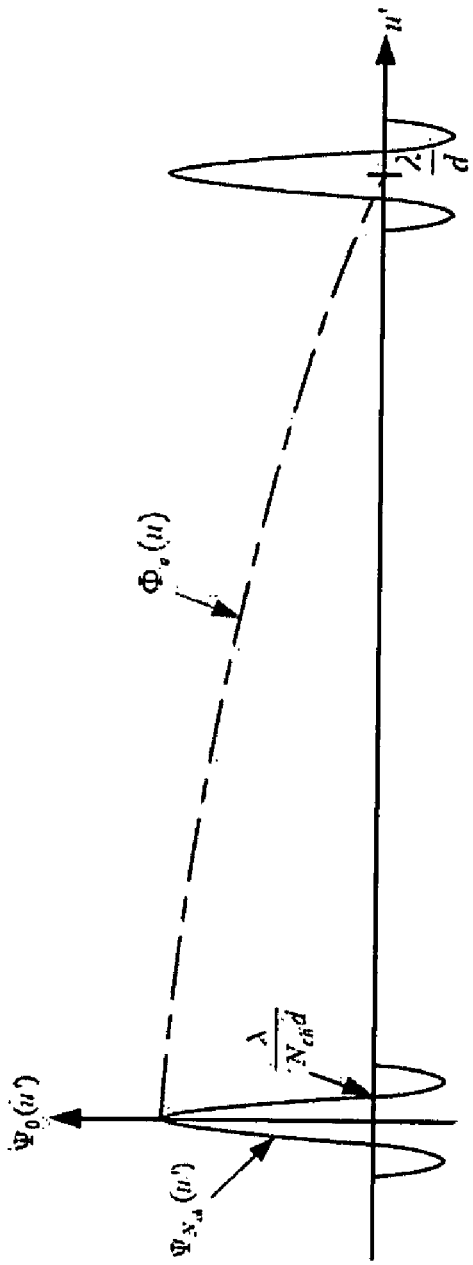
FIG. 3(a) shows the case where the FSA is used.
Figure 3B:
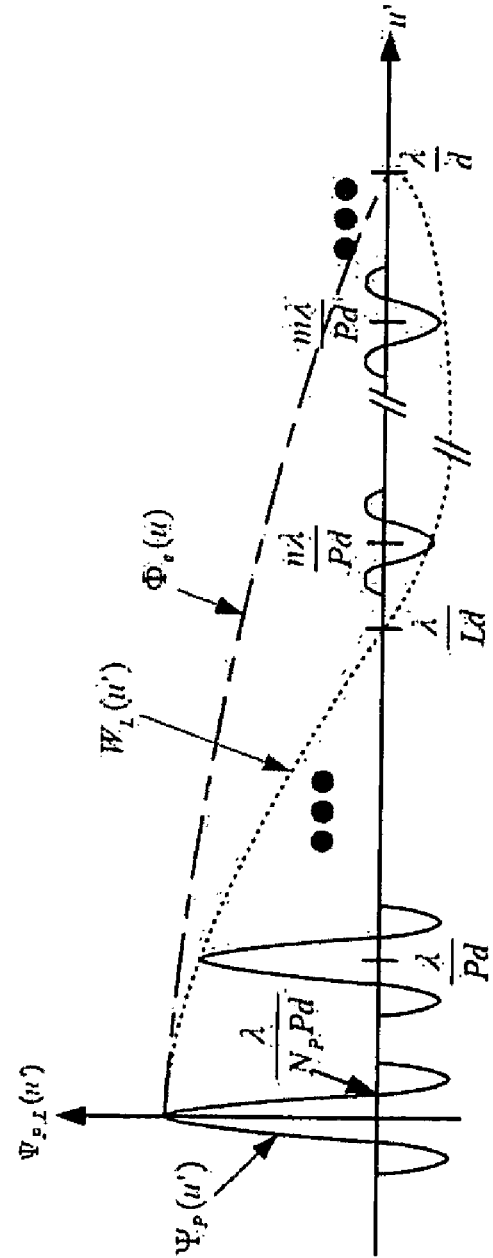
FIG. 3(b) shows the case where the periodic sparse array is used.

Meanwhile, FIG. 3 shows unidirectional continuous wave beam patterns that are used to analyze the differences in the lateral beam pattern between an FSA and a sparse array, wherein FIG. 3(a) shows the case where the FSA is used, and FIG. 3(b) shows the case where the periodic sparse array is used. In FIG. 3, functions $\Psi_P(u')$, $W_L(u')$ and $\Phi_e(u)$, which constitute a function $\Psi_{P,L}(u')$, are represented by a solid line, a dotted line and a dot chain line, respectively. The width of the main lobe of $\Psi_P(u')$ can be obtained, as shown in the following Equation 3, and the locations of the grating lobes of the sparse array can be obtained from the following Equation 4:

$$\frac{2\lambda}{N_P P d} = \frac{2\lambda}{N_{ch} d} \qquad (3)$$

Locations of grating lobes of $$\Psi_P(u') : \frac{m\lambda}{Pd} \ (m : \text{integer}) \qquad (4)$$

In the case where a sparse array technique is applied in a sector scanning method using a phased array, a grating lobe is not generated in regions other than the principal region $-\lambda/d < u' < \lambda/d$ that is used for ultrasound images. Furthermore, in the case of a linear or curved array transducer, grating lobes are negligibly small in regions other than the principal region due to $|\Phi_e(u)|^2$ in a bidirectional beam pattern. Accordingly, for the purposes of the analysis and design of a sparse array, in the present invention, the grating lobes located in a principal region are referred to as excessive grating lobes, and are considered first.

Meanwhile, $W_L(u')$, which is a lateral beam pattern attributable to L consecutive elements, is applied as the weight function of the lateral beam pattern, and is characterized in that it has null positions at locations represented by Equation 5:

Null positions of $W_L(u')$:

$$\frac{l\lambda}{Ld} \ (l : \text{integer}) \qquad (5)$$

From Equations 4 and 5, it can be seen that in the case of an FSA for which L=P, all excessive grating lobes are eliminated because the positions of grating lobes exactly correspond with the null positions of a weight function, with the result that $\Psi_P(u')$ has grating lobes only at positions corresponding to multiples of $\lambda/d$. Furthermore, it can be seen that in the case of L≠P, the excessive grating lobes of $\Psi_{P,L}(u')$ located at q=n$\lambda$/PD=m$\lambda$/Ld are eliminated by the weight function.

Setting of Intervals of Transmit and Receive Sparse Arrays and Number of Array Elements Used The patterns of transmit and receive sparse arrays must be selected such that excessively great grating lobes are not generated in a final beam pattern obtained as the product of a transmit beam pattern and a receive beam pattern. For this purpose, the patterns of transmit and receive sparse arrays must be configured not to generate grating lobes at the same location. In the present specification, grating lobes that are formed by transmit and receive grating lobes at the same location and greatly influence a final beam pattern are referred to as "Common Grating Lobes (CGLs)." Since excessive grating lobes generated at different locations in a transmit or receive sparse array may be reduced by the side lobes of a receive or transmit beam pattern, unlike common grating lobes, the final beam pattern of the periodic sparse array can be optimized by eliminating or suppressing common grating lobes. Accordingly, two conditions required for the optimization of the design of a periodic sparse array will be described below. In the present specification, for the sake of convenience, the interval P and number of elements L of a transmit receive sparse array are defined as $(P_T, L_T)$, and the interval P and number of elements L of a receive sparse array P are defined as $(P_R, L_R)$.

First Condition: Sparse Array Design ($P_T > L_T$ & $P_R > L_R$ & $P_T \neq P_R$)

First, a first condition under which all transmit and receive arrays are sparse arrays is $P_T > L_T$ and $P_R > L_R$. In this case, since all common grating lobes in the case of $P_T = P_R$ cannot be eliminated, a precondition for an optimal transmit and receive periodic sparse array pair is $P_T \neq P_R$. The reason for this will be described below. Since in the case of $P_T = P_R$, all the excessive grating lobes of the transmit sparse array are placed at the same location as the receive sparse array, all excessive grating lobes are common grating lobes, and thus elimination can be achieved only in the case of $L_T = P_T$ or $L_R = P_R$. This means that at least one of the transmit and receive arrays must be an FSA so as to avoid common grating lobes. Accordingly, in order to design a pair of transmit and receive sparse arrays in which common grating lobes can be eliminated, $P_T$ and $P_R$ must have different values.

Second Condition: Elimination of Common Grating Lobes

The second condition includes the conditions under which common grating lobes are not generated in the following cases when $(P_T, L_T)$ of a transmit sparse array is paired with $(P_R, L_R)$ of a receive sparse array. The following three cases M1, M2 and M3 exist:

M1: in the case where $P_T$ and $P_R$ are coprime integers,

M2: in the case where arbitrary $P_T$ and $P_R$ satisfy the conditions $P_T > P_R$ and $L_T = P_R$, or M3: in the case where $P_T$ and $P_R$ are not coprime integers and $P_T \neq P_R$, common grating lobes are not generated if $L_T$ or $L_R$ is the greatest common divisor of $P_T$ and $P_R$. The above-described three cases will be sequentially described below.

First, the case of M1 will be described. The transmit and receive sparse arrays have excessive grating lobes at respective locations u'=n$\lambda$/$P_T$d and u'=m$\lambda$/$P_R$d(n,m≧1). Among these excessive grating lobes, grating lobes corresponding to n$\lambda$/$P_T$d=m$\lambda$/$P_R$d are common grating lobes. In the case where $P_T$ and $P_R$ are coprime, this condition is satisfied if $n=kP_T$ and $m=kP_R$ ($k=1, 2, \ldots$). Accordingly, the locations of the common grating lobes are given as $u'=k\lambda/d$. However, these locations do not belong to the principal region of an ultrasound image. Accordingly, in the case where $P_T$ and $P_R$ are coprime, common grating lobes do not exist in the principal region of an ultrasound image.

Next, the case of M2 will be described. If random integers $P_T$ and $P_R$ are considered, PT>PR and LT=PR<PT, and thus, the transmit array under consideration is a sparse array. In this case, $W_{L_T}(u')$ has null positions at locations $u'=n\lambda/P_R d$, $1 \leq n \leq P_R - 1$. Since the excessive grating lobes of the receive sparse array are generated at the same locations as $W_{L_T}(u')$, receive grating lobes are completely eliminated from a final beam pattern, and thus common grating lobes are not generated.

Next, the case of M3 will be described below. If it is assumed that an integer $n_0$ greater than 1 is the greatest common divisor of $P_T$ and $P_R$, two integers $k_T$ and $k_R$ that do not have a common divisor other than 1 and are coprime, can be obtained, as shown in the following Equation 6:

$k_T=P_T/n_0$ $k_R=P_R/n_0$ (6)

Here, since $k_T/P_T=k_R/P_R=1/n_0$, $$\frac{k_T}{P_T} \cdot \frac{\lambda}{d} = \frac{k_R}{P_R} \cdot \frac{\lambda}{d} = \frac{1}{n_0} \cdot \frac{\lambda}{d}.$$

From this, it can be seen that the $k_T$-th excessive grating lobe of the transmit sparse array and the $k_R$-th excessive grating lobe of the receive sparse array are placed at the same location $u'=\lambda/n_0 d$. Furthermore, since $k_T$ and $k_R$ have a coprime relationship therebetween, this grating lobe is a first common grating lobe. In other words, each $k_T$-th grating lobe of the transmit sparse array and the $k_R$-th grating lobe of the receive sparse array constitute the common grating lobe. That is, if a common grating lobe is placed at location $u'=n\lambda/n_0 d$, $n \geq 1$, a total of $n_0 - 1$ common grating lobes exist. Meanwhile, if $L_T$ or $L_R$ is the greatest common divisor of $P_T$ and $P_R$, that is, $n_0$, the null positions of a weight function are exactly placed at the location $u'=n\lambda/n_0 d, n \geq 1$, so that all common grating lobes are eliminated.

Meanwhile, when the greatest common divisor $n_0$ of $P_T$ and $P_R$ of the transmit and receive sparse arrays is greater than 1, the equal sections of $n_0 - 1$ having the beam patterns as the periodic sparse arrays of $(P_T, L_T=k_T,1)$ and $(P_R, L_R=k_R,1)$ exist in the principal region of $u'$. The reason is described below. When $n_0$ is the greatest common divisor of $P_T$ and $P_R$, $k_T$ and $k_R$ are coprime. The $k_T$-th grating lobe of the transmit sparse array and the $k_R$-th grating lobe of the receive sparse array constitute a common grating lobe that is placed at the location $u'=n\lambda/n_0 d$ ($1 \leq n \leq n_0 - 1$). Accordingly, when the principal region of $u'$ is divided into $n_0 - 1$ sections, a m-th section is $m\lambda/n_0 d \leq u' \leq (m+1)\lambda/n_0 d$ ($0 \leq m \leq n_0 - 1$). In this case, each section is divided into $k_T$ sections at intervals of $\lambda/P_T d$ in the case of the transmit beam pattern, while each section is divided into $K_R$ sections at intervals of $\lambda/P_R d$ in the case of the receive beam pattern. Therefore, if the influence of $\Phi_e(u)$ is ignored, each section includes exactly the same beam pattern as the beam patterns of the periodic sparse arrays of $(P_T, L_T)=(k_T, 1)$ and $(P_R, L_R)=(k_R, 1)$.

Design of Optimal Periodic Sparse Array

Up to now, the fact that common grating lobes must be eliminated so as to optimize the beam pattern of periodic sparse arrays and the three methods for eliminating common grating lobes have been described. However, since various periodic sparse array pairs corresponding to the respective cases may exist, criteria for evaluating the performance of the respective pairs are required. Accordingly, in the present invention, a Sparsity Factor (SF) and Destructive Beam Cross-interference (DBC) are defined, comparison and analysis are performed on the performance of a design technique proposed based on the results of the comparison and analysis, and a method of determining an optimal periodic sparse array pair is provided.

First, when common grating lobes have been eliminated, $L_T$ or $L_R$ must be selected so as to suppress excessive grating lobes to levels equal to or lower than a desired level while keeping the number of elements actually used in transmit and receive arrays as low as possible. In the following description, the SF of the transmit and receive sparse arrays is defined as Equation 7, and the total SF is expressed as Equation 8:

$$SF_T = \frac{P_T}{L_T} SF_R = \frac{P_R}{L_R} \quad (7)$$

$$SF = SF_T \cdot SF_R = \frac{P_T}{L_T} \cdot \frac{P_R}{L_R} \quad (8)$$

From Equations 7 and 8, it can be seen that the SF increases in inverse proportion to the number of elements actually used within an interval. In general, the most important reason for using the sparse array technique is to reduce the number of channels that are actually used. It can be said that among sparse arrays having beam patterns with the same performance, sparse arrays having a higher SF are superior. From this perspective, in the present specification, the case where the minimum values are used as $L_T$ and $L_R$ so that the SF is largest is referred to as a basic form. Accordingly, with regard to the foregoing three cases, the basic form of (M1) is the case where both $L_T$ and $L_R$ are all 1, the basic form of (M2) is the case where $L_T=P_R$ and $L_R=1$, and the basic form of (M3) is the case where $L_T=n0$ and $L_R=1$. Furthermore, in the present specification, for the sake of convenience, the case where LT and LR are not the minimum values is referred to as an extended form.

Next, 'DBC' is defined using the distance between a main lobe and first transmit and receive grating lobes and the distance between the transmit and receive grating lobes. For the sake of convenience, when the locations of the transmit and receive grating lobes are respectively expressed as TGL(n) and RGL(m) ($0<n<P_T$, $0<m<P_R$) and TGL(0) and RGL(0) are expressed as the locations of main lobes, the DBC is defined as the following Equation 9:

$$DBC_{M_T G_{R1}} = |TGL(0) - RGL(1)| = \frac{\lambda}{P_R d} \quad (9)$$

$$DBC_{M_R G_{T1}} = |RGL(0) - TGL(1)| = \frac{\lambda}{P_T d}$$

$$DBC_{G_{T_n} G_{R_m}} = |TGL(n) - RGL(m)| = \left| \frac{n\lambda}{P_T d} - \frac{m\lambda}{P_R d} \right|$$

When common grating lobes have been eliminated, an excessive transmit or receive grating lobe is limited to a level equal to or lower than that of the side lobe of a receive or transmit beam pattern in a final beam pattern. Here, since the shape of a principal beam pattern is similar to that of the sine function of sparse arrays, the side lobe of a unidirectional beam pattern is generated at every distance corresponding to half of the width of a main lobe, and has a level inversely proportional to the distance to a main lobe. FIG. 4 is a table in which the obtained levels of respective side lobes of a principal beam pattern are listed. From FIG. 4, it can be seen that the 10th side lobe of the transmit or receive beam pattern is a level of about −30 dB.

Meanwhile, the minimum value of the DBC for the basic forms of transmit and receive sparse arrays from which common grating lobes have been eliminated can be expressed as the following Equation 10:

$$\min\left(\left|\frac{n\lambda}{P_T d} - \frac{m\lambda}{P_R d}\right|\right) = \frac{\lambda}{SF \cdot d} \qquad (10)$$

Equation 10 will be described below. Since $$\min\left(\left|\frac{n\lambda}{P_T d} - \frac{m\lambda}{P_R d}\right|\right) = \min\left(\left|\frac{(nP_R - mP_T)\lambda}{P_T P_R d}\right|\right),$$

$\min(|nP_R - mP_T|)$ is obtained. Here, when the integer set $Z_R = \{P_R, 2P_R, \ldots, (P_T - 1)P_R\}$ is defined, $nP_R \in Z_R$, so that $\min(|nP_R - mP_T|)$ means the minimum value of the remainders obtained by dividing respective elements of $Z_R$ by $P_T$. Here, since in the case of (M1) among the above-described three cases, $P_T$ and $P_R$ are coprime, the least common multiple is $P_T \cdot P_R$, so that every element of $Z_R$ is not divided by $P_T$ without a remainder. Furthermore, with regard to two elements $aP_R$ and $bP_R$ (a>b) of $Z_R$, $(a-b)P_R$ is an element of $Z_R$ again and is not divided by $P_T$ also. From this, it can be seen that every element of $Z_R$ is not divided by $P_T$ without a remainder, and remainders have different values when division by $P_T$ is performed. Therefore, the case where a remainder is 1 when an element of $Z_R$ is divided by $P_T$ always exists. That is, since $\min(|nP_R - mP_T|) = 1$, $$\min\left(\left|\frac{(nP_R - mP_T)\lambda}{P_T P_R d}\right|\right) = \frac{\lambda}{P_T P_R d} = \frac{\lambda}{SF \cdot d}.$$

Meanwhile, since in the case of (M2) among the above-described three cases, all receive grating lobes have been eliminated, RGL(m) does not exist, so that $$\min\left(\left|\frac{n\lambda}{P_T d} - \frac{m\lambda}{P_R d}\right|\right) = \frac{\lambda}{P_T d} = \frac{\lambda}{SF \cdot d}.$$

Finally, in the case of (M3) among the above-described three cases, $\min(|nP_R - mP_T|) = \min(|nk_R - mk_T|) \cdot n_0$. Meanwhile, since $k_T$ and $k_R$ are coprime, $\min(|nk_R - mk_T|) = 1$. Accordingly, $$\min\left(\left|\frac{n\lambda}{P_T d} - \frac{m\lambda}{P_R d}\right|\right) = \frac{n_0 \lambda}{P_T P_R d} = \frac{\lambda}{SF \cdot d}.$$

By using Equation 10, when periodic sparse arrays are designed, a final grating lobe suppression level for given design variables can be estimated or the condition of principal variables capable of meeting a desired grating lobe suppression level can be determined.

By using the above-described methods according to preferred embodiments of the present invention, the basic and extended forms of various periodic sparse arrays in which grating lobes are suppressed to the desired extent. However, in order to acquire a transmit and receive sparse array pair having optimal performance among the periodic sparse arrays, various discussions are required. First of all, comparing the case of $(P_T, L_T, P_R, L_R) = (6,1,5,1)$ with the case of $(P_T, L_T, P_R, L_R) = (10,1,3,1)$, these cases are cases that are the basic forms of (M3) among the above-described methods and have the same SF=30. Accordingly, according the minimum value theorem of the DBC, for the two cases, the minimum value of the DBC is $\lambda/30d$. However, for the former case, the total number of transmit and receive grating lobes is 5+4=9, and, for the latter case, the total number of transmit and receive grating lobes is 9+2=11. Furthermore, the distance between RGL(0), which is the main lobe of the receive beam pattern, and TGL(1), which is the first transmit grating lobe of the main lobe, is $\lambda/6d$ for the former case and $\lambda/10d$ for the latter case. Therefore, it is determined that the former case has a superior final beam pattern.

Furthermore, of basic forms having the same SF, the case where the transmit SF and the receive SF have similar values has the most excellent beam pattern performance. Accordingly, when the above-described SFs are the same, the difference between the transmit SF and the receive SF is calculated for each pair, and (PT,LT) of the transmit sparse array and (PR,LR) of the receive sparse array, for which the difference is lowest, can be determined.

Furthermore, comparing beam pattern performances for the basic forms of M1, M2 and M3 having the same SF, the shortest distances between transmit and receive grating lobes are the same. Since M2 and M3 not only enables common grating lobes but also suppresses excessive grating lobes, unlike M1, M2 and M3 has more excellent beam pattern performance than M1. In practice, since M2 enables the arbitrary selection of $L_T$, it has the most excellent beam pattern performance.

Design of Apodization Function

Figure 5:
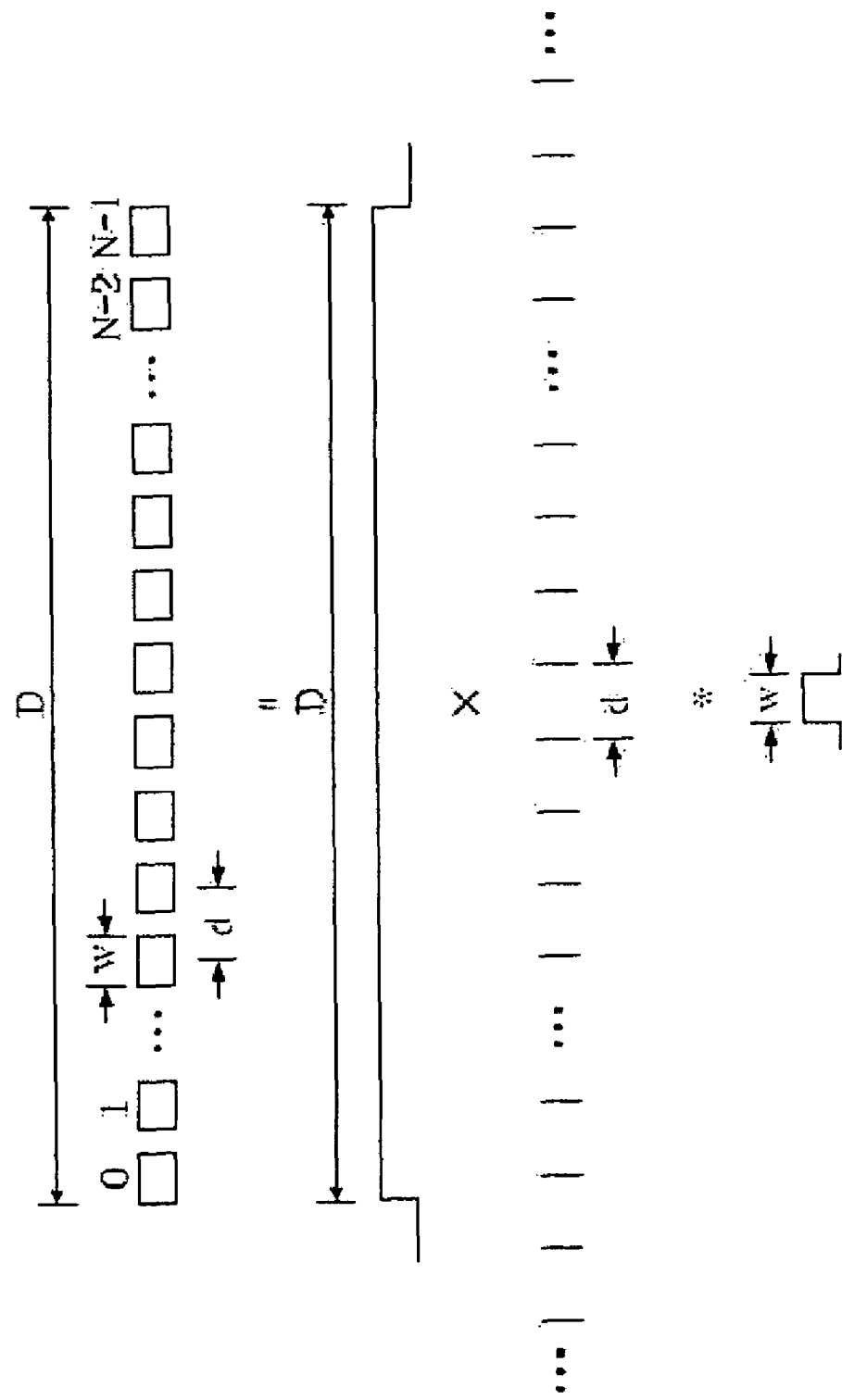
FIG. 5 is a diagram that is illustrated to analyze the aperture function of a uniform weighted FSA from the point of view of signal processing.
Figure 6:
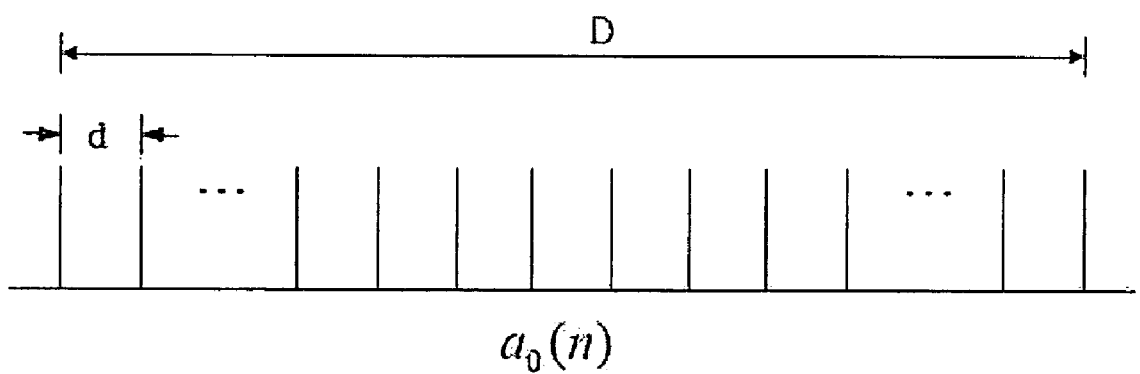
FIG. 6 is a diagram showing the aperture function of the uniform weighted FSA.

FIG. 5 is a diagram that is illustrated to analyze the aperture function of a uniform weighted FSA from the point of view of signal processing. The aperture function of the uniform weighted FSA may be analyzed from the point of view of signal processing, as shown in FIG. 5. Accordingly, in the case where aperture D includes N array elements, aperture function $a_0(n)$ indicative of the principal characteristics of a beam pattern generally has a relationship of D ≫ d ☐ w, and thus the aperture function can be expressed by Equation 11. FIG. 6 is a diagram showing the aperture function of the uniform weighted FSA having the characteristics.

$$a_0(n) = \left[rect\left(\frac{x}{D}\right)comb\left(\frac{x}{d}\right)\right]$$

$$= \sum_{n=-N/2}^{N/2-1} \delta\left(\frac{x-n}{d}\right)$$

Since a unidirectional beam pattern at a transmit focusing point or in a Fraunhofer region can be obtained through the Fourier transform, the aperture function of Equation 11 can be reanalyzed using the following Equation 12 from the point of view of signal processing. Here, $a_p(n)$ refers to a uniform weighted periodic sparse array having an interval of p, and $h_0(p)$ refers to the aperture function of a uniform weighted FSA including p elements. Accordingly, the aperture function of a typical uniform weighted FSA is the same as the convolution of the aperture function of the uniform weighted periodic sparse array having an interval of p and the convolution of the aperture function of the uniform weighted FSA including p elements. Accordingly, the effective aperture in the case where uniform weighted FSAs are used for both transmission and reception based on Equation 12 may be expressed as the following Equation 13:

$$a_0(n) = \left[rect\left(\frac{x}{D}\right)comb\left(\frac{x}{d}\right)\right] \quad (12)$$
$$= \left[rect\left(\frac{x}{D}\right)comb\left(\frac{x}{Pd}\right)\right] * \left[rect\left(\frac{x}{Pd}\right)comb\left(\frac{x}{d}\right)\right]$$
$$= a_P(n) * h_0(p), \, p = 0, 1, \ldots, P-1$$

$$e(n) = a_0(n) * a_0(n) \quad (13)$$
$$= [a_{P_T}(n) * h_0(p_T)] * a_0(n)$$
$$= a_{P_T}(n) * [a_0(n) * h_0(p_T)]$$

From Equation 13, it can be seen that with regard to transmit and receive aperture functions, the effective apertures of periodic sparse arrays, such as those of Equations 14 and 15, are equal to those of uniform weighted FSAs, so that grating lobes are not generated.

$$a_T(n) = a_{P_T}(n) \quad (14)$$

$$a_R(n) = a_0(n) * h_0(p_T) \quad (15)$$

That is, when a non-uniform weighted FSA in which a function obtained by convoluting the aperture function of an FSA including N elements with the aperture function of an FSA including $P_T$ elements is applied as an apodization function is used as a receive array in the case where a uniform weighted periodic sparse array having a transmit interval of $P_T$ is used, grating lobes can be eliminated. The reason for this is that since an unidirectional beam pattern is obtained through the Fourier transform of an aperture function, a null position exists at a location where the result of the Fourier transform of the $h_0$(PT) corresponds with the location of a grating lobe appearing in the beam pattern of $a_{P_T}$(n).

Figure 7A:
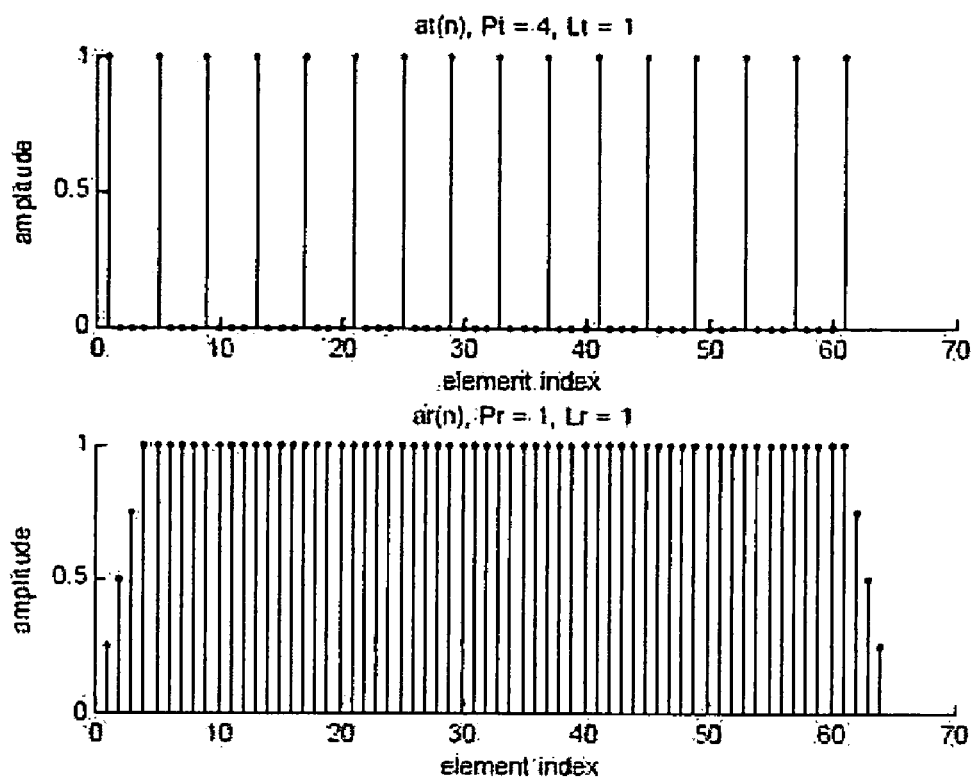
FIG. 7 is a diagram showing transmit and receive aperture functions and effective apertures in the case of p=4.
Figure 7B:
Figure 8:
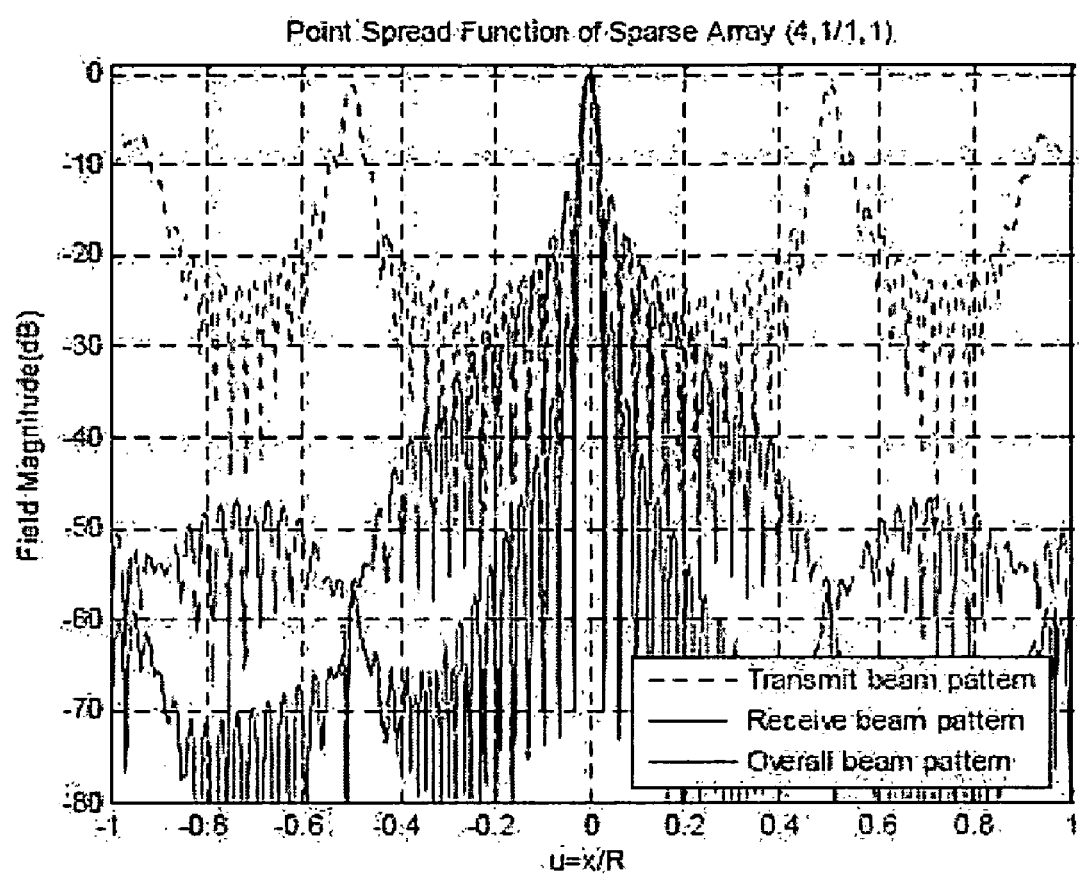
FIG. 8 shows transmit and receive beam patterns and a final beam pattern in the case of FIG. 7.

FIG. 7 is a diagram showing transmit and receive aperture functions and effective apertures in the case of p=4. As analyzed through Equation 13, it can be seen that the shape of the effective apertures exactly correspond with those of the effective apertures of the uniform weighted FSA. Furthermore, FIG. 8 shows transmit and receive beam patterns and a final beam pattern in this case. Here, the transmit beam pattern is represented by dotted lines, the receive beam pattern is represented by chain lines, and the final beam pattern is represented by solid lines. In the same manner, as analyzed through Equation 13, since all grating lobes are suppressed to levels equal to or lower than 55 dB in the final beam pattern, it can be said that the grating lobes have been eliminated. Furthermore, from the comparison with FIG. 1(a), it can be seen that the result in which the width of a main lobe is scarcely increased and the level of side lobes is efficiently reduced.

This means that if a non-uniform weighted FSA in which a receive aperture function is expressed as Equation 15 is used as a uniform weighted transmit sparse array having an arbitrary interval, an optimal beam pattern from which all grating lobes have been eliminated can be obtained and the effect of suppressing the level of side lobes while scarcely sacrificing the width of the main lobe is achieved. Furthermore, the apodization function can be implemented using very simple hardware because the apodization function is required to weight only both end portions of an aperture, as shown in FIG. 7(a), and the apodization function includes only $P_T$ values corresponding to the transmit interval.

Figure 9:
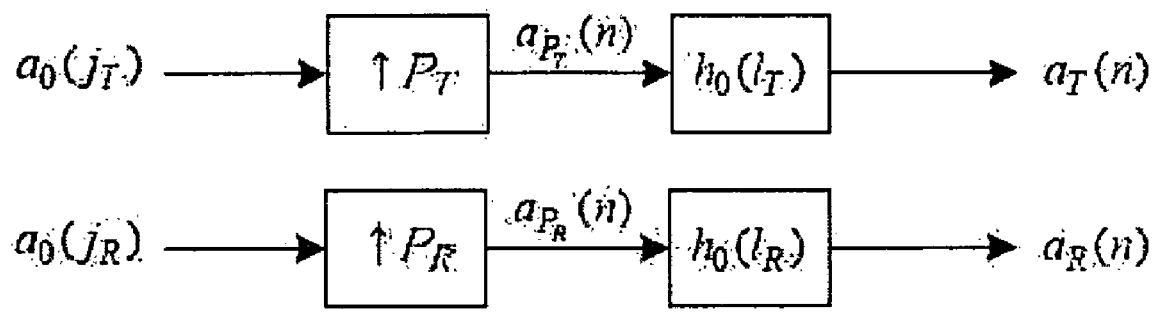
FIG. 9 is a diagram showing a model for the signal processing of the uniform weighted periodic sparse array having an interval of p.

Now, the aperture function $a_p$(n) of a uniform weighted periodic sparse array having an interval of p is analyzed from the point of view of signal processing. FIG. 9 shows a model for the signal processing of the uniform weighted periodic sparse array having an interval of p. The aperture function is the same as that obtained by up-sampling the aperture function $a_0$(j), j=0, 1, 2, . . . , j−1 of a uniform weighted FSA including J array elements, as shown in FIG. 9, p times, and is expressed as the following Equation 16:

$$a_p(n) = \begin{cases} a_0(j), & n = Pj \\ 0, & otherwise \end{cases} \quad (16)$$

Here, J is the greatest integer that is equal to or less than a value obtained by dividing the total number of elements of an array transducer by P, and is expressed as the following Equation 17:

$$J = \left|\frac{N}{P}\right| \quad (17)$$

Figure 10:
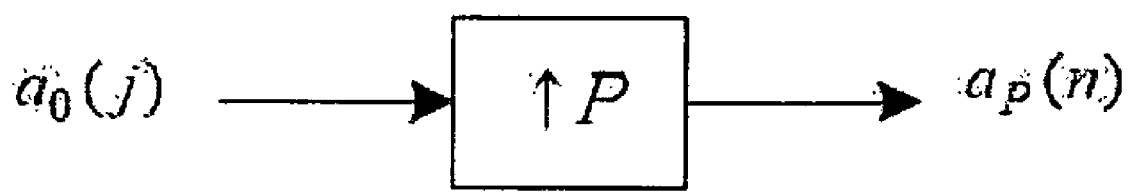
FIG. 10 is a diagram showing a signal processing model for the uniform weighted periodic sparse array.

The result of the Fourier transform of $a_p$(n) is p times narrower than that of $a_0$(j), and has an interval of 1/p. That is, when the same number of channels are used, the beam pattern of the periodic sparse array is different from that of the FSA in that the width of the main lobe is reduced p times and a grating lobe is generated at intervals of 1/p. Furthermore, as in the general model of the uniform weighted periodic sparse array, a transmit and receive aperture function in the case where L array elements are used within p intervals can be obtained by convoluting the aperture function of Equation 16 with the aperture function of an FSA including L array elements, as shown in FIG. 10, so that they can be expressed by the following Equation 18:

$$a_T(n) = a_{P_T}(n) * h_0(l_T), l_T = 0, 1, \ldots, L_T - 1$$

$$a_R(n) = a_{P_R}(n) * h_0(l_R), l_R = 0, 1, \ldots, L_R - 1 \quad (18)$$

Here, PT and PR are respectively transmit and receive intervals, $L_T$ and $L_R$ are respectively the number of transmit array elements used within a corresponding interval and the number of receive array elements used within a corresponding interval, and $h_0$(l) is the aperture function of the FSA including L array elements. Accordingly, since the Fourier transform of $h_0$(l) results in a signal having a null position at every 1/L, transmit and receive grating lobes placed at such locations can be eliminated.

Meanwhile, conditions for $L_T$ and $L_R$ capable of eliminating common grating lobes are based on the above-described method of eliminating common grating lobes.

Meanwhile, since in Equation 16, the aperture function of the uniform weighted periodic sparse array having an interval of p is obtained by up-sampling the aperture function $a_0$(j) of the uniform weighted FSA p times from the point of view of signal processing, the locations of its own grating lobes do not vary, even though the apodization function is applied to $a_0$(j) and the result of the application is up-sampled p times. Accordingly, the above-described design conditions for eliminating common grating lobes are still effective. In this case, if the transmit apodization function applied to $a_0$(j) enables the elimination of all receive grating lobes and the receive apodization function enables the elimination of all transmit grating lobes, it can be said that the functions are optimal apodization functions.

Meanwhile, with regard to the basic forms of M1, M2 and M3, the DBC, that is, the shortest distance between the transmit grating lobe and the receive grating lobe, is $\lambda/SF \cdot d$. Meanwhile, in the case of M1, all elements of ZR are not divided by PT without remainders, and the remainders obtained through division by PT have different values. Accordingly, it can be seen that each receive grating lobe is spaced apart from a corresponding transmit grating lobe by $n\lambda/(P_T P_R) \cdot d$, $n=1, 2, \ldots, P_T-1$. This means that receive grating lobes are generated at points that are obtained by equally dividing the distance between two neighboring transmit grating lobes by $P_R$. Meanwhile, the beam pattern between two neighboring transmit grating lobes exactly corresponds with the beam pattern of $a_0(j)$ of Equation 16. Accordingly, in the case of M1, all receive grating lobes can be eliminated by applying a weight function to $a_0(j)$ so as to enable it to have a null position at every $\lambda/P_R d$ and performing up-sampling $P_R$ times. In the same manner, all transmit grating lobes can be eliminated by applying a weight function to a0(j) so as to enable it to have a null position at $\lambda/P_T d$ and performing up-sampling $P_T$ times. In contrast, since in the case of M2, only transmit grating lobes exist, weighting may be performed on only a receive periodic sparse array. In the case of M3, transmit and receive periodic sparse arrays may be allowed to have null positions at every $\lambda/k_R d$ and $\lambda/k_T d$.

An apodization function having the above characteristics can be obtained using the method used in Equation 6. That is, transmit and receive apodization functions $w_T(j_T)$ and $w_R(j_R)$ are defined as the following Equation 19:

$$w_{jT}(j_T) = a_0(j_T) * h_0(p_R), j_T = 0, 1, \ldots, j_T - 1$$

$$w_{jR}(j_R) = a_0(j_R) * h_0(p_T), j_R = 0, 1, \ldots, j_R - 1 \quad (19)$$

This is a non-uniform weight function, as described in conjunction with Equation 15. Here, since $J_T$ and $J_R$ are values determined by Equation 17 and the transient response of the convolution function does not occur when $J_T' \geq P_R$ and $J_R' \geq P_T$, $J_T$ and $J_R$ must satisfy the following Equation 20:

$$J_T \geq 2P_R - 1$$

$$J_R \geq 2P_T - 1 \quad (20)$$

Accordingly, when Equation 17 is substituted into Equation 20, the greatest $P_T$ and $P_R$ in which the apodization function can be defined for the given size of an aperture are expressed by the following Equations 21 and 22:

$$\left| \frac{N}{P_T} \right| \geq 2P_R - 1 \quad (21)$$

$$\therefore P_T \leq \left| \frac{N}{2P_R - 1} \right|$$

$$P_R \leq \left| \frac{N}{2P_T - 1} \right| \quad (22)$$

In Equation 19, the Fourier transform of transmit apodization function $w_{j_T}(j_T)$ results in a null position at every $1/P_R d$, and the Fourier transform of receive apodization function $w_{j_R}(j_R)$ results in a null position at every $1/P_T d$.

Now, apodization functions $w_{P_T}(n)$ and $w_{P_R}(n)$ obtained by up-sampling the apodization function of Equation 19 $P_T$ and $P_R$ times are defined as Equation 23:

$$w_{P_T}(n) = \begin{cases} w_{jT}(j_T), & n = P_T j_T \\ 0, & \text{otherwise} \end{cases} \quad (23)$$

$$w_{P_R}(n) = \begin{cases} w_{jR}(j_R), & n = P_R j_R \\ 0, & \text{otherwise} \end{cases}$$

When the results of the Fourier transform of the transmit and receive apodization functions are expressed by $W_{P_T}(f)$ and $W_{P_R}(f)$, $W_{P_T}(f)$ has grating lobes at intervals of $1/P_T d$ and $W_{P_R}(f)$ has grating lobes at intervals of $1/P_R d$, so that it can be seen that the apodization function does not influence the locations of the grating lobes. Furthermore, $W_{P_T}(f)$ and $W_{P_R}(f)$ have null positions at locations expressed in Equations 24 and 25:

$$\text{zero point of } W_{P_T}(f) = \frac{i\lambda}{(P_T \cdot P_R)d} \quad (24)$$

$$i = 1, 2, \ldots, (P_T \cdot P_R - 1), i \neq m_{P_T} P_R,$$

$$m_{P_T} = 1, 2, \ldots, P_T - 1$$

$$\text{zero point of } W_{P_R}(f) = \frac{i\lambda}{(P_T \cdot P_R)d} \quad (25)$$

$$i = 1, 2, \ldots, (P_T \cdot P_R - 1), i \neq m_{P_R} P_T,$$

$$m_{P_R} = 1, 2, \ldots, P_R - 1$$

Since the null positions of the transmit apodization function shown in Equation 24 exist at all $\lambda/(PT \cdot PR)d$ except for the locations of transmit grating lobes, the null positions are equal to the null positions of $w_{j_T}(j_T)$ of Equation 19 in the case where i is a multiple of PT. Furthermore, the null positions of the receive apodization function of Equation 25 are also equal to the null positions of $w_{j_R}(j_R)$ of Equation 19 with the exception of those at the locations of receive grating lobes in the case where i is a multiple of $P_R$. Meanwhile, in the case where the locations of the transmit grating lobes correspond with the locations of the receive grating lobes, the non-uniform weighted periodic sparse array of Equation 23 cannot have null positions at the locations, so that such grating lobes are not eliminated. However, such common grating lobes can be eliminated using the above-described design methods of the uniform weighted periodic sparse array.

Figure 11:
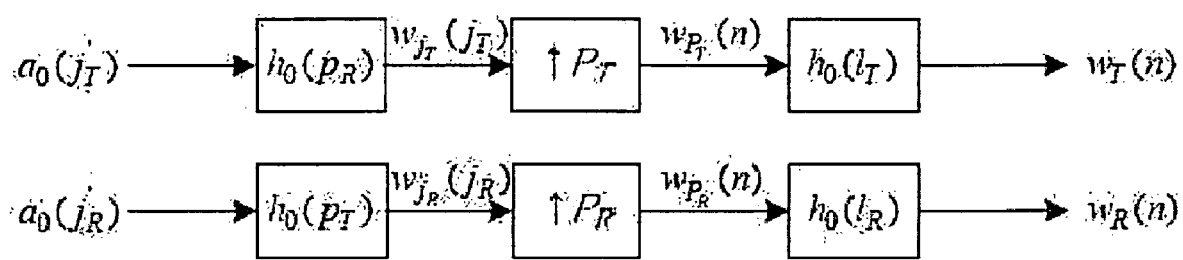
FIG. 11 is a diagram showing a signal processing model for transmit and receive apodization functions according to the present invention.

Accordingly, the optimal non-uniform weighted periodic sparse array proposed by the present invention may be expressed as shown in FIG. 11 and Equation 26 based on FIG. 10 and Equations 19 and 23. FIG. 10 shows a signal processing model for the uniform weighted periodic sparse array, and FIG. 11 shows a signal processing model for transmit and receive apodization functions according to the present invention.

$$w_T(n) = w_{P_T}(n) * h_0(l_T)$$

$$w_R(n) = w_{P_R}(n) * h_0(l_R) \quad (26)$$

Although the analyses of Equations 19 to 26 correspond to the case of M1, the same analyses may be applied to the cases of M2 and M3 if a few variables are replaced. That is, in the case of M2, only transmit grating lobes exist, only the application of $w_{j_R}(j_R)$ to Equation 19 is required. In the case of M3, only the use of $h(k_T)$ and $h(k_R)$, instead of $h(P_T)$ and $h(P_R)$, in Equation 19 is required.

The non-uniform weighted periodic sparse array according to a preferred embodiment of the present invention is characterized in that it can eliminate all common grating lobes using $h_0(l_T)$ and $h_0(l_R)$ and the other all excessive grating lobes using $w_{P_T}(n)$ and $w_{P_R}(n)$. Accordingly, the non-uniform weighted periodic sparse array according to the present invention may be said to be a non-uniform weighted periodic sparse array that is optimized for the design objective of eliminating the grating lobes. Furthermore, the effect of reducing the level of side lobes while scarcely increasing the width of a main lobe can be achieved. As can be seen from FIG. 7, the proposed apodization function includes only values obtained by equally dividing the great value of the aperture function by 'p', so that there is an advantage in that the burden of additional hardware is very low.

Meanwhile, the aperture function $h_0(n \times P_R)$ of an FSA including a number of array elements equal to a multiple $(n \times P_R)$ of the interval $P_R$ of the receive sparse array is obtained, the aperture function $a_0(j_T)$ is convoluted with the aperture function $h_0(n \times P_R)$, and final transmit apodization function $W_T(n)$ can be determined using weight function $w_{PT}(n)$ up-sampled $P_T$ times. In contrast, the aperture function $h_0(m \times P_T)$ of an FSA including a number of array elements equal to a multiple $(m \times P_T)$ of the interval PT of the transmit sparse array is obtained, the aperture function $a_0(j_R)$ is convoluted with the aperture function $h_0(m \times P_T)$, and final receive apodization function $W_R(n)$ can be determined using weight function $w_{PR}(n)$ up-sampled $P_R$ times.

In this case, since the non-uniform weight function has a larger number of levels, excessive grating lobes can be further suppressed, but there are defects in that the complexity of implementation is increased and SNR is decreased.

The optimal design method for periodic sparse arrays according to the present invention may be widely used for ultrasound imaging systems.

In order to evaluate the performance of the non-uniform weighted periodic sparse array according to the present invention, image tests using beam patterns, specimen images and actual data were conducted. Beam pattern tests were conducted in such a way that the results of a continuous beam pattern in a focusing plane obtained when a signal having a center frequency of 3 MHz was focused at 60 mm were represented on a log scale using Matlab, in which case the distance between array elements was l/2 and a phased array transducer including 64 array elements was assumed to be used. In these results, a transmit beam pattern is represented by dotted lines, a receive beam pattern is represented by chain lines, and a final beam pattern is represented by solid lines. Although the beam pattern analysis in the present invention has been performed through approximation using a continuous wave in a focusing plane or a Fraunhofer region, the analysis in the tests was performed based on equations without using approximation. Accordingly, from the tests and the simulation specimen images, it can be verified that performance lower than performance expected through analysis might be achieved in a region closer than a focusing point, but the technique having an excellent beam pattern in a region in which approximation was applied could have excellent performance in that region. As a result, the beam pattern tests were performed only on a transmit focusing point.

Furthermore, simulation specimen image tests were conducted using Field II, which was an ultrasound simulation data generation program. With regard to test conditions, a phased array transducer including 64 array elements and a transmission signal having a center frequency of 3 MH were used and a transmit focusing point was assumed to be 60 mm, as in the beam pattern tests. Furthermore, 40 MHz was used as the sampling frequency, and the ultrasound speed was assumed to be 1540 m/s. Under these test conditions, the greatest depth of the images was set to 200 mm, and images of a simulation specimen having point reflectors at distances ½, 1, 1.5, 2, and 3 times that to the transmit focusing point from the center of the transducer at angles of 40° distance were acquired so as to efficiently check the influence of grating lobes. Furthermore, the scanning angle of the images was set to −45°~45°, 128 scanning lines were constructed within this angular range, and signal processing, including DC cancellation, envelope detection, log compression and scan conversion, was performed on respective scanning lines, thereby acquiring final images. In this case, the dynamic range of log compression was set to 60 dB. Through these simulation specimen images, a Pulsed Wave (PW) beam patterns can be acquired. Accordingly, the simulation specimen image tests enable PW beam patterns and simulation specimen images to be shown for the proposed respective methods.

Meanwhile, in order to verify the results of simulation tests through actual images, simulation tests were conducted based on the data acquired from actual ultrasound equipment. Test data was disclosed by the Biomedical Engineering Department of University of Michigan, was acquired by repeating a process of transmitting a signal from a single array element and receiving the signal through all array elements, and can be converted into data that is acquired in the case where a signal is transmitted and received via an arbitrary channel.

Since the array transducer used in the tests included 64 array elements, the periodic sparse arrays for M1, M2 and M3 were designed to have desired beam pattern performances using the minimum value theorem of the DBC, design was performed such that the grating lobes of a final beam pattern could be suppressed to levels equal to or less than −30 dB, and then tests were conducted. Accordingly, since the minimum value of the DBC must be greater than a distance corresponding to a 10-th side lobe, the SF must be equal to or less than 6. The non-uniform weighted periodic sparse arrays used in the tests were allowed to be compared with the cases that use no apodization function using design examples for M1, M2 and M3 for uniform weighted periodic sparse arrays.

Figure 12A:
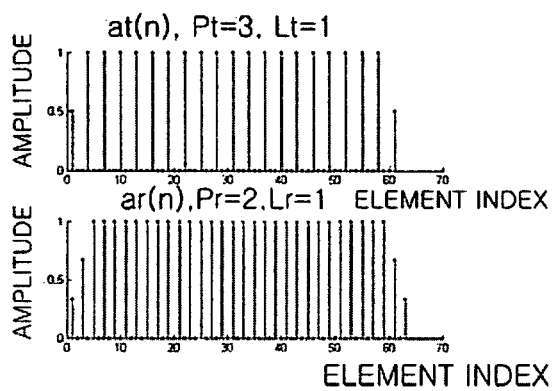
FIGS. 12(a) and 12(b) show the case of $(P_T,L_T,P_R,L_R=3,1,2,1)$.
Figure 12B:
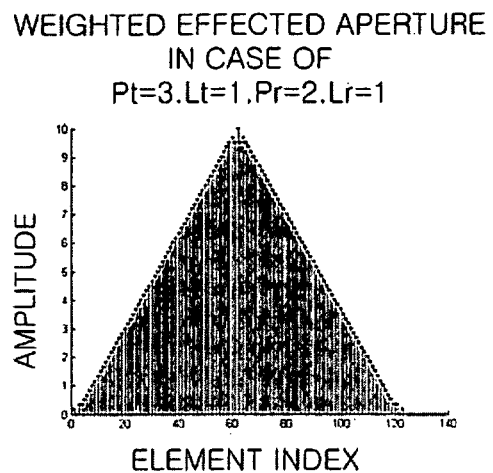
Figure 12C:
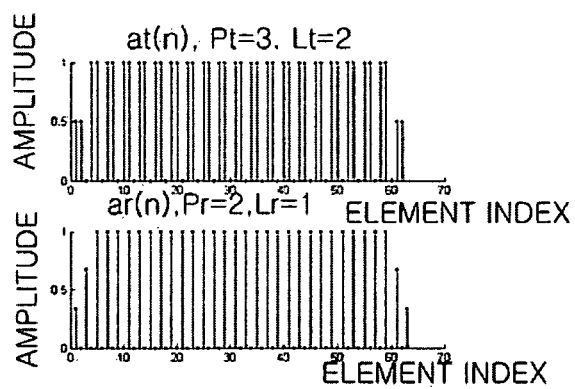
FIGS. 12(c) and 12(d) show the case of $(P_T,L_T,P_R,L_R=3,2,2,1)$.
Figure 12D:
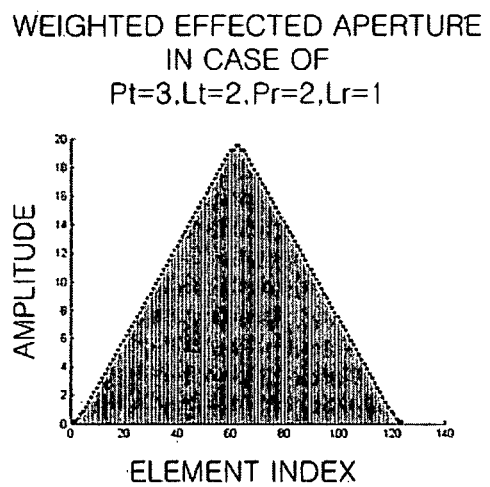
Figure 12E:
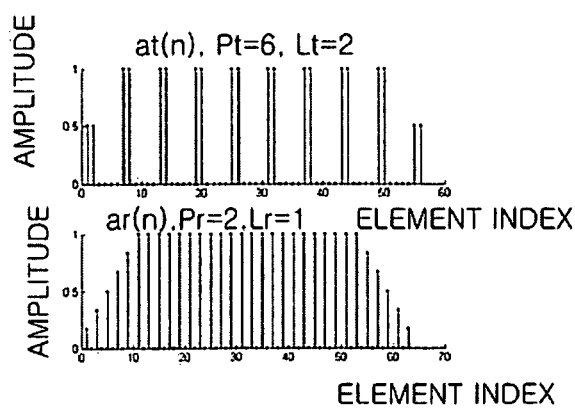
FIGS. 12(e) and 12(f) show the case of $(P_T,L_T,P_R,L_R=6,2,2,1)$.
Figure 12F:
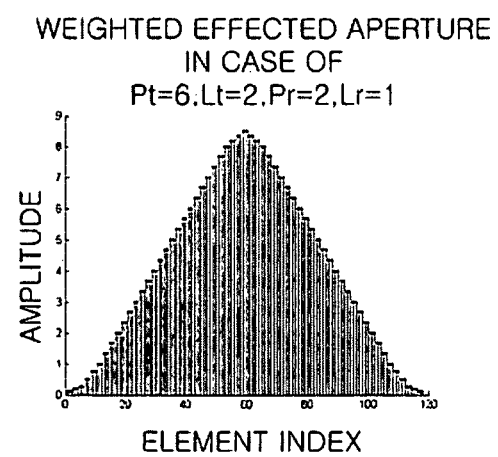
Figure 13A:
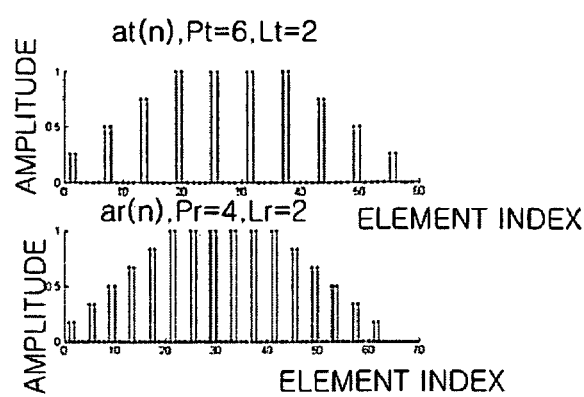
FIGS. 13(a) and 13(b) show the case of $(P_T,L_T,P_R,L_R=6,2,4,2)$.
Figure 13B:
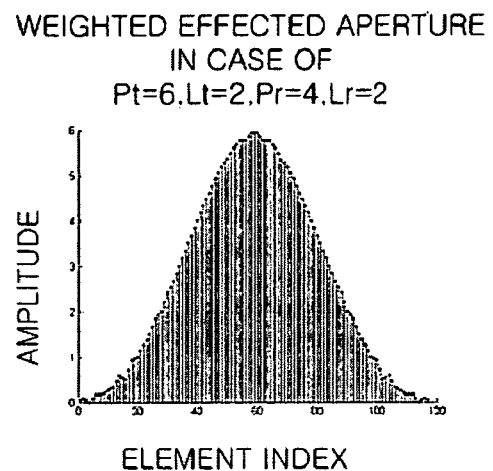
Figure 13C:
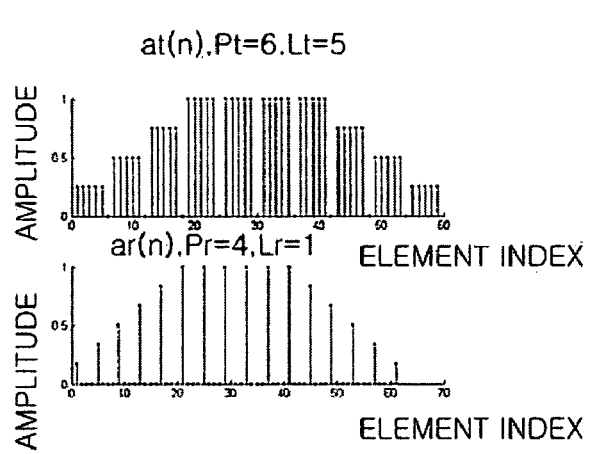
FIGS. 13(c) and 13(d) show the case of $(P_T,L_T,P_R,L_R=6,5,4,1)$.
Figure 13D:
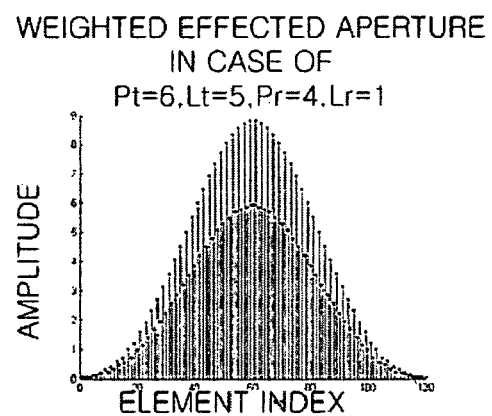

Prior to a description of continuous wave beam pattern tests, it is necessary to discuss the aperture function and effective aperture of the non-uniform weighted periodic sparse array according to the present invention. FIG. 12 shows graphs illustrating the aperture functions and effective apertures of non-uniform weighted periodic sparse arrays according to the present invention, wherein FIGS. 12(a) and 12(b) show the case of $(P_T,L_T,P_R,L_R=3,1,2,1)$, FIGS. 12(c) and 12(d) show the case of $(P_T,L_T,P_R,L_R=3,2,2,1)$, and FIGS. 12(e) and 12(f) show the case of $(P_T,L_T,P_R,L_R=6,2,2,1)$. FIG. 13 shows graphs illustrating the aperture functions and effective apertures of non-uniform weighted periodic sparse arrays according to the present invention, wherein FIGS. 13(a) and 13(b) show the case of $(P_T,L_T,P_R,L_R=6,2,4,2)$, and FIGS. 13(c) and 13(d) show the case of $(P_T,L_T,P_R,L_R=6,5,4,1)$. As can be seen from FIGS. 12 and 13, the effective apertures of the proposed non-uniform weighted interval sparse arrays do not exactly correspond with the effective apertures of the uniform weighted FSAs, but have a very smooth window function shape, compared to the various effective apertures of uniform weighted periodic sparse arrays. Accordingly, it can be expected that the beam pattern of the non-uniform weighted periodic sparse array according to the present invention has more excellent performance than the uniform weighted periodic sparse array. However, in the cases of FIGS. 13(c) and 13(d) where common grating lobes have not been eliminated, the characteristics of the effective apertures have discrete points, so that all grating lobes cannot be eliminated.

Figure 14A:
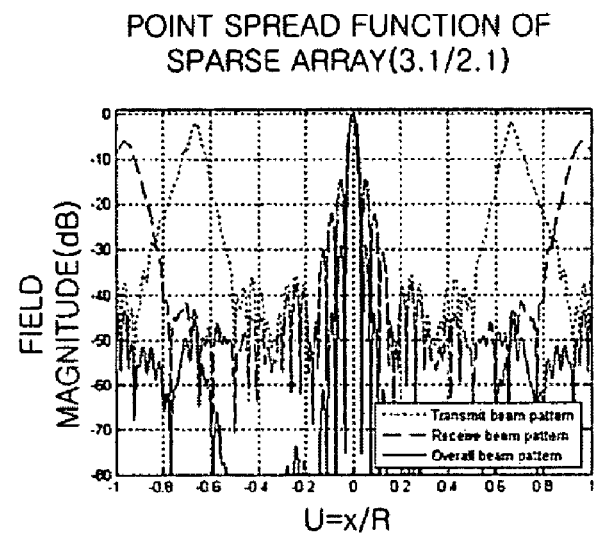
FIG. 14(a) shows the case of $(P_T,L_T,P_R,L_R=3,1,2,1)$.
Figure 14B:
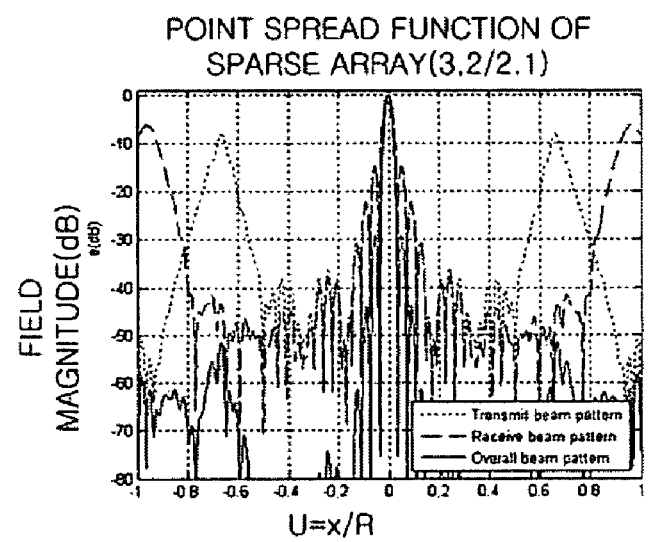
FIG. 14(b) shows the case of $(P_T,L_T,P_R,L_R=3,2,2,1)$.
Figure 14C:
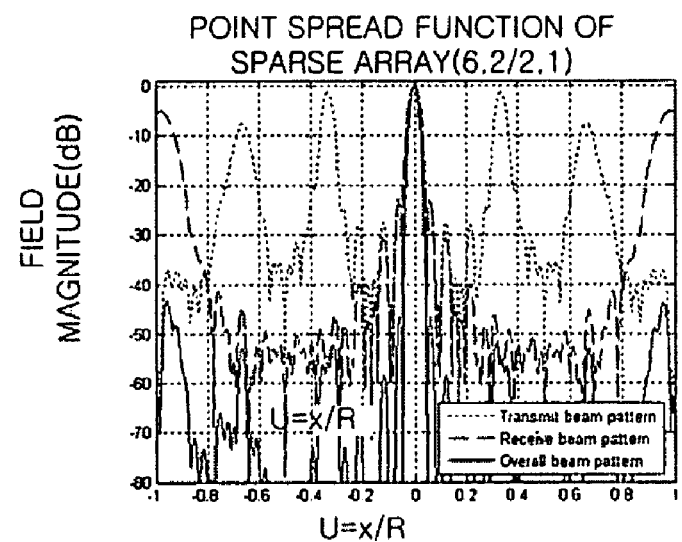
FIG. 14(c) shows the case of $(P_T,L_T,P_R,L_R=6,2,2,1)$.
Figure 14D:
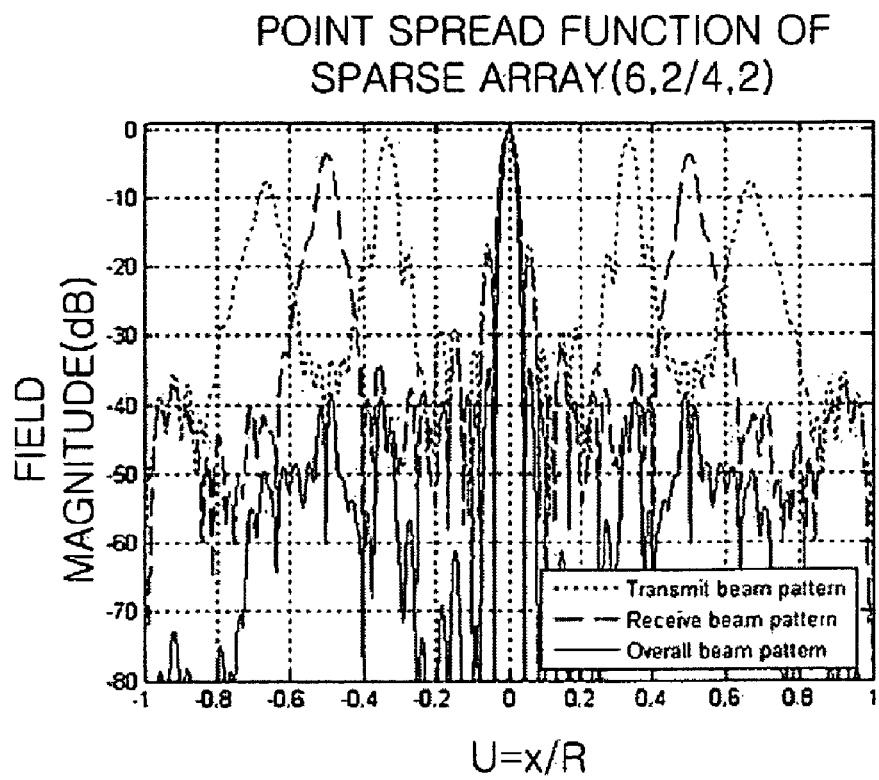
FIG. 14(d) shows the case of $(P_T,L_T,P_R,L_R=6,2,4,2)$.
Figure 14E:
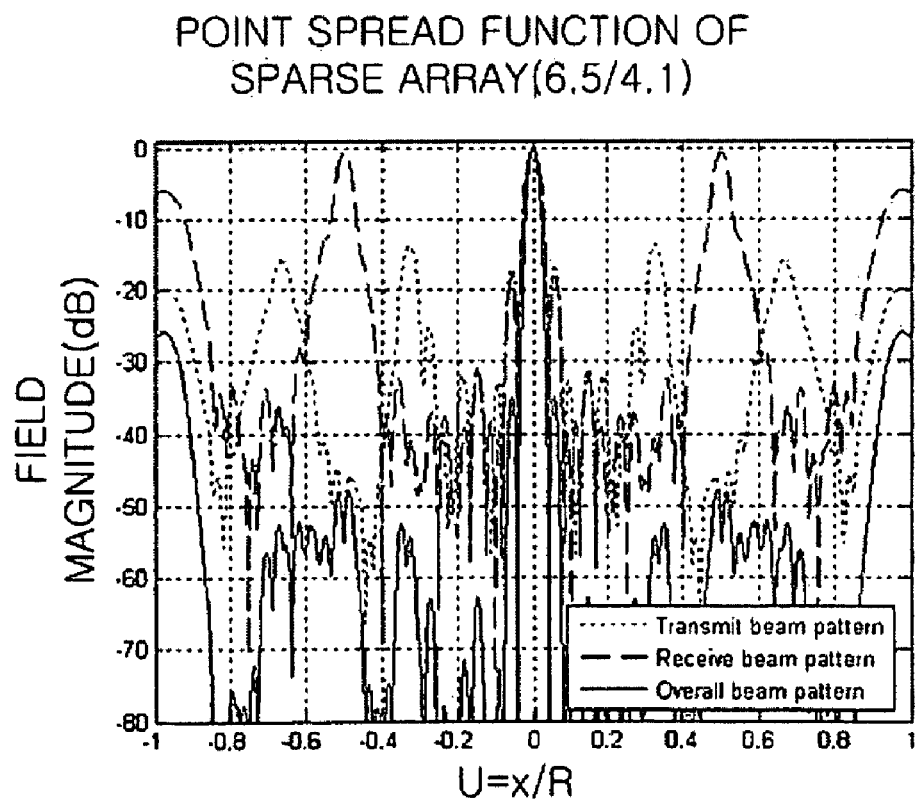
FIG. 14(e) shows the case of $(P_T,L_T,P_R,L_R=6,5,4,1)$.
Figure 15A:
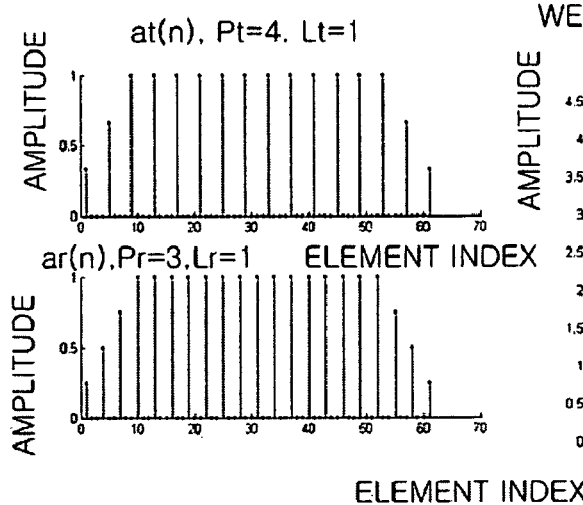
FIGS. 15(a) and 15(b) show the case of $(P_T,L_T,P_R,L_R=4,1,3,1)$.
Figure 15B:
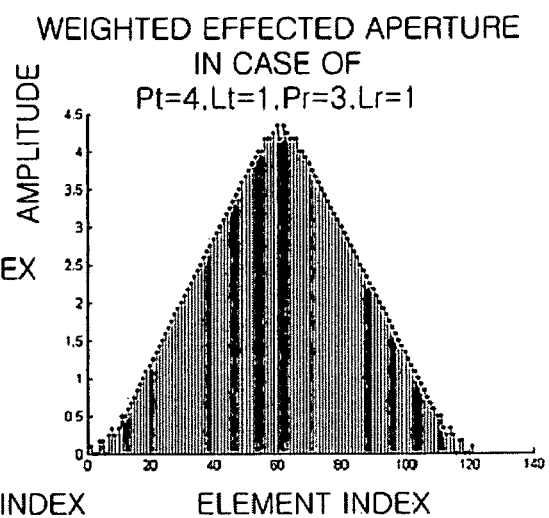
Figure 15C:
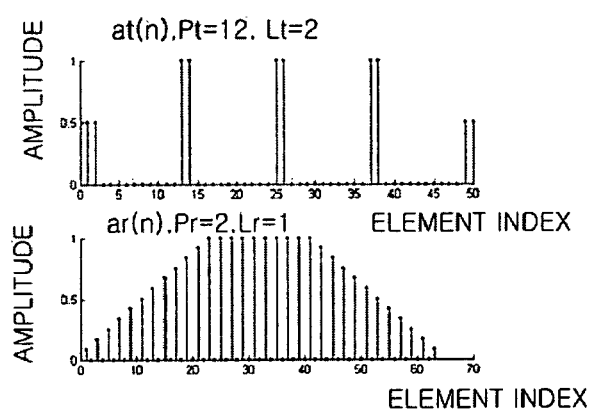
FIGS. 15(c) and 15(d) show the case of $(P_T,L_T,P_R,L_R=12,2,2,1)$.
Figure 15D:
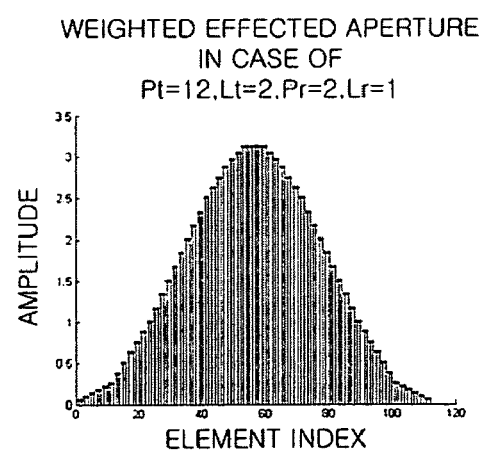
Figure 15E:
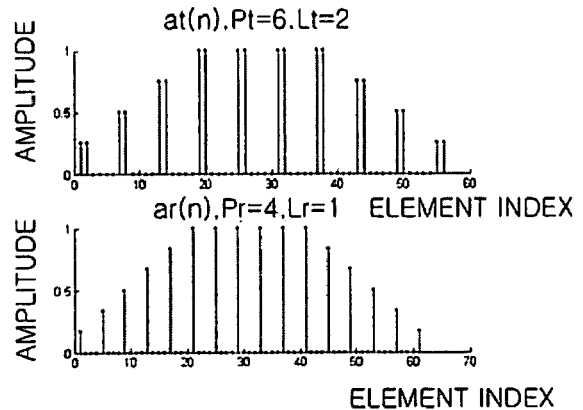
FIGS. 15(e) and 15(f) show the case of $(P_T,L_T,P_R,L_R=6,2,4,1)$.
Figure 15F:
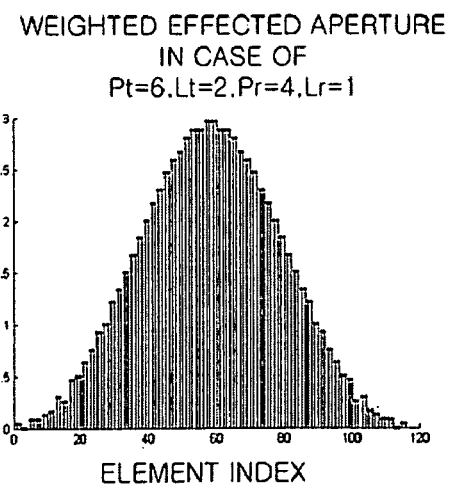

The forgoing expectation can be verified by acquiring continuous wave beam patterns for the respective cases. FIG. 14 shows graphs illustrating the continuous wave beam patterns of the non-uniform weighted periodic sparse arrays according to the present invention, wherein FIG. 14(a) shows the case of $(P_T,L_T,P_R,L_R=3,1,2,1)$, FIG. 14(b) shows the case of $(P_T,L_T,P_R,L_R=3,2,2,1)$, FIG. 14(c) shows the case of $(P_T,L_T,P_R,L_R=6,2,2,1)$, and FIG. 14(d) shows the case of $(P_T,L_T,P_R,L_R=6,2,4,2)$, and FIG. 14(e) shows the case of $(P_T,L_T,P_R,L_R=6,5,4,1)$. FIG. 14 shows continuous wave beam patterns that were acquired through computer simulation tests. As expected through the foregoing analysis and effective apertures, in the beam patterns of the proposed non-uniform weighted periodic sparse arrays, the width of main lobes are scarcely increased, and the effect of suppressing grating lobes is improved by about 10 dB.

Meanwhile, the apodization function according to the present invention may be applied to the extended forms. In contrast, in the case of FIG. 14(e), the non-uniform weighted periodic sparse arrays according to the present invention cannot eliminate common grating lobes, and thus grating lobes having levels equal to or higher than 30 dB exist.

Accordingly, since the non-uniform weighted periodic sparse arrays according to the present invention can improve the performance of beam patterns compared with the uniform weighted periodic sparse array, they can increase the SF compared with the uniform weighted periodic sparse arrays. Since in this case, the transducer including 64 array elements is assumed to be used, the greatest $P_T$ is 12 based on Equations 9 and 10, and the corresponding $P_R$ is 2. In the present tests, the cases of $(P_T,L_T,P_R,L_R=4,1,3,1)$, $(P_T,L_T,P_R,L_R=12,2,2,1)$ and $(P_T,L_T,P_R,L_R=6,2,4,1)$, the SFs of which are twice those of the uniform weighted periodic sparse arrays are discussed. The respective cases respectively correspond to the cases that are designed using the method M1, M2 and M3, which are proposed for the uniform weighted periodic sparse arrays.

Figure 16A:
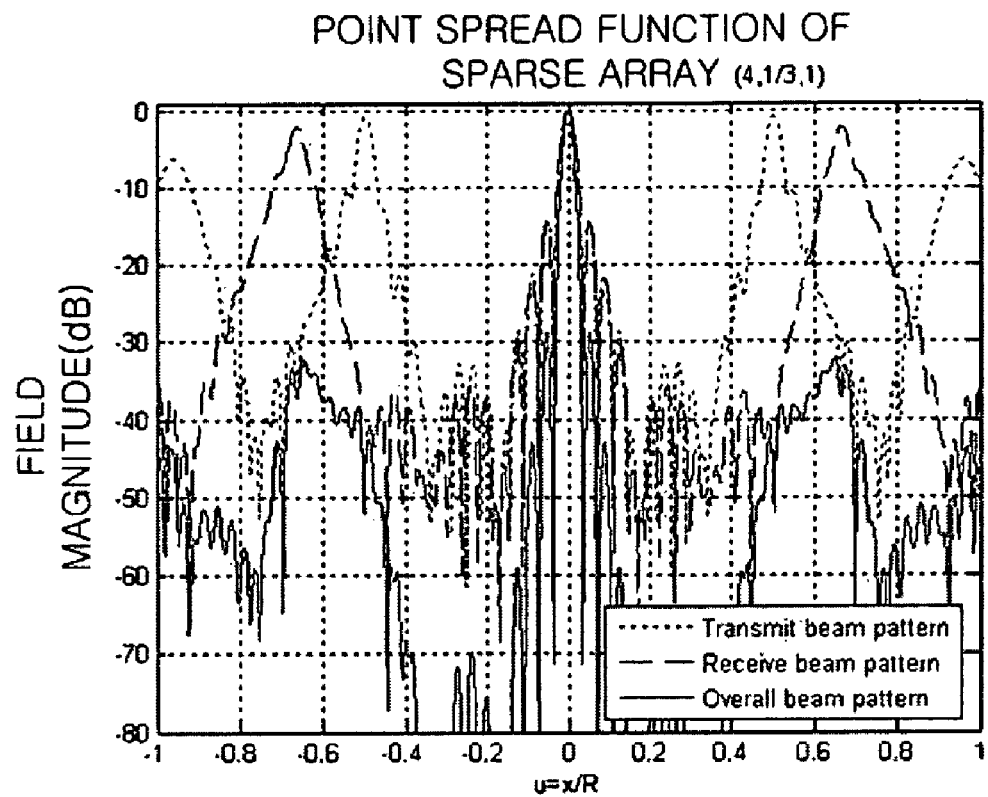
FIG. 16(a) shows the case of $(P_T,L_T,P_R,L_R=4,1,3,1)$.
Figure 16B:
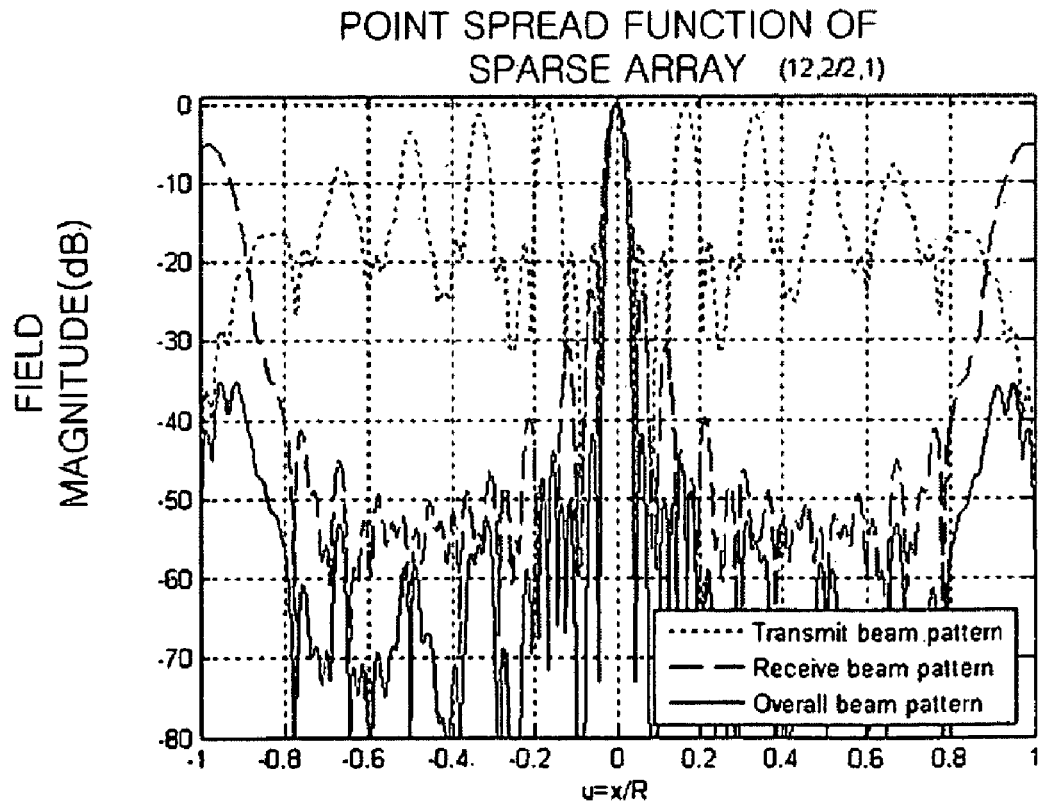
FIG. 16(b) shows the case of $(P_T,L_T,P_R,L_R=12,2,2,1)$.
Figure 16C:
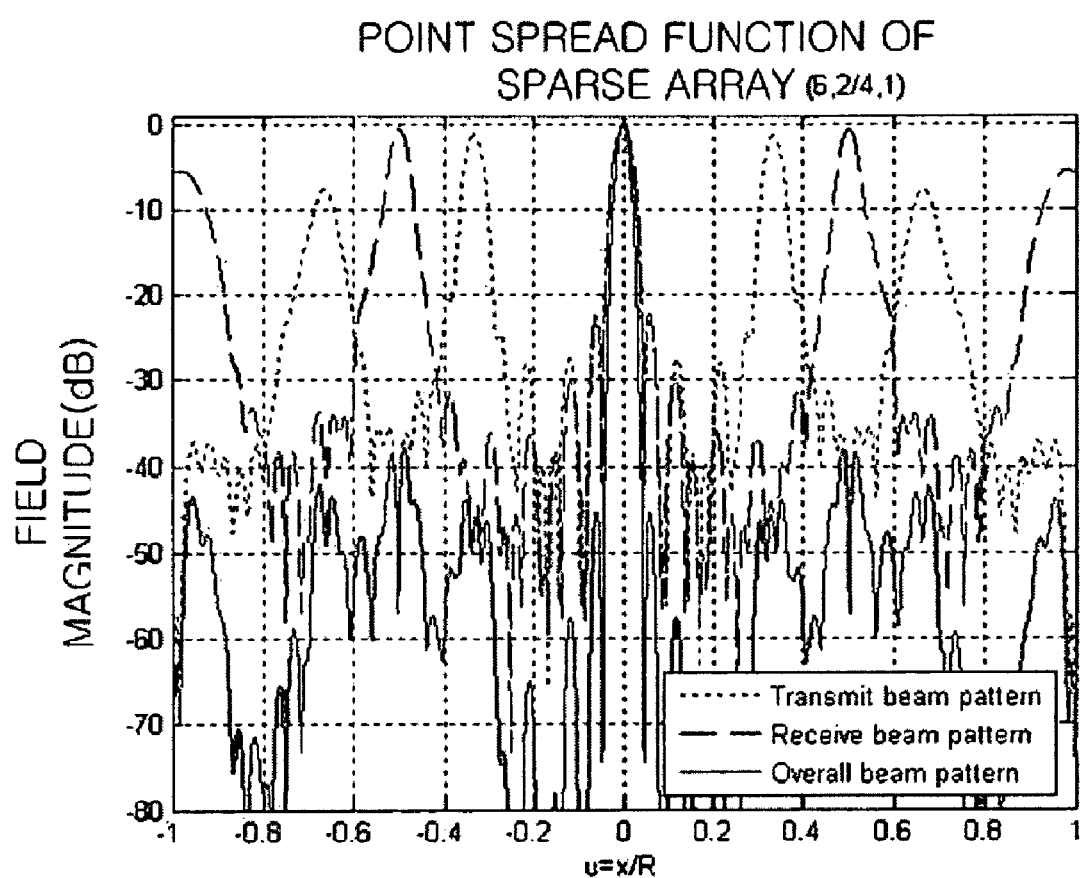
FIG. 16(c) shows the case of $(P_T,L_T,P_R,L_R=6,2,4,1)$.

The aperture functions and effective apertures of the respective cases are shown in FIG. 15. FIG. 15 shows graphs illustrating the aperture functions and effective apertures of the non-uniform weighted periodic sparse arrays in the cases where SFs are increased twice according to the present invention, FIGS. 15(a) and 15(b) show the case of $(P_T,L_T,P_R,L_R=4,1,3,1)$, FIGS. 15(c) and 15(d) show the case of $(P_T,L_T,P_R,L_R=12,2,2,1)$, and FIGS. 15(e) and 15(f) show the case of $(P_T,L_T,P_R,L_R=6,2,4,1)$. From FIG. 15, it can be seen that although the SFs are increased twice those of the uniform weighted periodic sparse arrays, the non-uniform weighted periodic sparse arrays according to the present invention can acquire effective apertures similar to those acquired by the FSAs. However, the total sum of effective aperture functions, that is, the energy of a signal, is decreased, with the result that the SNR is decreased. Furthermore, continuous wave beam patterns for respective cases of FIG. 15 are acquired and illustrated in FIG. 16. That is, FIG. 16 shows graphs illustrating the continuous wave beam patterns of the non-uniform weighted periodic sparse arrays in the cases, the SFs of which are increased twice according to the present invention, wherein FIG. 16(a) shows the case of $(P_T,L_T,P_R,L_R=4,1,3,1)$, FIG. 16(b) shows the case of $(P_T,L_T,P_R,L_R=12,2,2,1)$, and FIG. 16(c) shows the case of $(P_T,L_T,P_R,L_R=6,2,4,1)$. From FIG. 16, it can be seen that all grating lobes are suppressed to levels equal to or lower than 30 dB.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for optimal design of non-uniform weighted periodic sparse arrays for an ultrasound imaging system, the ultrasound imaging system having an array transducer including a total of N elements, the method comprising the steps of:
    (a) setting an interval $P_T$ of a transmit sparse array and a number $L_T$ of array elements within the interval $P_T$ so that common grating lobes are not generated in beam patterns of the transmit sparse array and a receive sparse array;
    (b) setting an interval $P_R$ of the receive sparse array and a number $L_R$ of array elements within the interval $P_R$ so that common grating lobes are not generated in the beam patterns of the transmit sparse array and the receive sparse array;
    (c) setting a transmit apodization function WT(n) configured to be applied to the beam pattern of the transmit sparse array;
    (d) setting a receive apodization function WR(n) configured to be applied to the beam pattern of the receive sparse array;
    (e) converting a first electric signal into a transmitted ultrasonic wave from the transmit sparse array; and
    (f) converting a received ultrasonic wave received by the receive sparse array into a second electric signal;
    wherein at least one independent time delay is applied to all N array transducer elements.

2. The method as set forth in claim 1, wherein the step (c) comprises:
    (c1) acquiring an aperture function $a_0(j_T)$ of a uniform weighted Full Sampled Array (FSA) including a number of array elements equal to $J_T$;
    (c2) acquiring an aperture function $h_0(P_R)$ of an FSA including a number of array elements equal to the interval $P_R$ of the receive sparse array;
    (c3) acquiring a weight function $w_{PT}(n)$ by convoluting the aperture function $a_0(j_T)$ with the aperture function $h_0(P_R)$ and then up-sampling a result of the convolution $P_T$ times;
    (c4) acquiring an aperture function $h_0(L_T)$ of an FSA including a number of array elements equal to a number $L_T$ of elements used in the transmit sparse array; and
    (c5) convoluting the weight function $w_{PT}(n)$ with the aperture function $h_0(L_T)$;
    wherein $J_T$ is a greatest integer equal to or less than a value obtained by dividing a total number N of elements of the array transducer by the interval $P_T$ of the transmit sparse array, and determines the transmit apodization function $W_T(n)$.

3. The method as set forth in claim 1, wherein the step (d) comprises:
    (d1) acquiring an aperture function $a_0(j_R)$ of a uniform weighted FSA including a number of array elements equal to $J_R$;
    (d2) acquiring an aperture function $h_0(P_T)$ of an FSA including a number of array elements equal to the interval $P_T$ of the receive sparse array;
    (d3) acquiring a weight function $w_{PR}(n)$ by convoluting the aperture function $a_0(j_R)$ with the aperture function $h_0(P_T)$ and then up-sampling a result of the convolution $P_R$ times;

(d4) acquiring an aperture function $h_0(L_R)$ of an FSA including a number of array elements equal to a number $L_R$ of elements used in the receive sparse array; and (d5) convoluting the weight function $w_{PR}(n)$ with the aperture function $h_0(L_R)$;

wherein $J_R$ is a greatest integer equal to or less than a value obtained by dividing a total number N of elements of the array transducer by the interval $P_R$ of the receive sparse array, and determines the transmit apodization function $W_R(n)$.

4. The method as set forth in claim 1, wherein the step (c) comprises:

(c1) acquiring an aperture function $a_0(j_T)$ of a uniform weighted FSA including a number of array elements equal to $J_T$;

(c2) acquiring an aperture function $h_0(n \times P_R)$ of an FSA including a number of array elements equal to a multiple $n \times P_R$ of the interval $P_R$ of the receive sparse array;

(c3) acquiring a weight function $w_{PT}(n)$ by convoluting the aperture function $a_0(j_T)$ with the aperture function $h_0(n \times P_R)$ and then up-sampling a result of the convolution $P_T$ times;

(c4) acquiring an aperture function $h_0(L_T)$ of an FSA including a number of array elements equal to a number $L_T$ of elements used in the transmit sparse array; and (c5) convoluting the weight function $w_{PT}(n)$ with the aperture function $h_0(L_T)$;

wherein $J_T$ is a greatest integer equal to or less than a value obtained by dividing a total number N of elements of the array transducer by the interval $P_T$ of the transmit sparse array, and determines the transmit apodization function $W_T(n)$.

5. The method as set forth in claim 1, wherein the step (d) comprises:

(d1) acquiring an aperture function $a_0(j_R)$ of a uniform weighted FSA including a number of array elements equal to $J_R$;

(d2) acquiring an aperture function $h_0(m \times P_T)$ of an FSA including a number of array elements equal to a multiple $m \times P_T$ of the interval $P_T$ of the receive sparse array;

(d3) acquiring a weight function $w_{PR}(n)$ by convoluting the aperture function $a_0(j_R)$ with the aperture function $h_0(m \times P_T)$ and then up-sampling a result of the convolution $P_R$ times;

(d4) acquiring an aperture function $h_0(L_R)$ of an FSA including a number of array elements equal to a number $L_R$ of elements used in the receive sparse array; and (d5) convoluting the weight function $w_{PR}(n)$ with the aperture function $h_0(L_R)$;

wherein $J_R$ is a greatest integer equal to or less than a value obtained by dividing a total number N of elements of the array transducer by the interval $P_R$ of the receive sparse array, and determines the transmit apodization function $W_R(n)$.

6. The method as set forth in claim 1, wherein the steps (a) and (b) comprise setting $P_T$ and $L_T$ of the transmit sparse array and $P_R$ and $L_R$ of the receive sparse array so that the interval $P_T$ of the transmit sparse array is not equal to the interval $P_R$ of the receive sparse array and the intervals $P_T$ and $P_R$ are coprime integers.

7. The method as set forth in claim 1, wherein the steps (a) and (b) comprise setting $P_T$ and $L_T$ of the transmit sparse array and $P_R$ and $L_R$ of the receive sparse array so that the interval $P_T$ of the transmit sparse array is not equal to the interval $P_R$ of the receive sparse array, $P_T > P_R$, and $L_T = P_R$.

8. The method as set forth in claim 1, wherein the steps (a) and (b) comprise setting $P_T$ and $L_T$ of the transmit sparse array and $P_R$ and $L_R$ of the receive sparse array so that the interval $P_T$ of the transmit sparse array is not equal to the interval $P_R$ of the receive sparse array, the intervals $P_T$ and $P_R$ are not coprime, and $L_T$ or $L_R$ is a greatest common divisor of $P_T$ and $P_R$.

9. The method as set forth in claim 1, further comprising the step (f) of, if a pair of $(P_T, L_T)$ of the transmit sparse array and $(P_R, L_R)$ of the receive sparse array set at the steps (a) and (b) includes a plurality of pairs, calculating a Sparse Factor (SF) and a minimum value of Destructive Beam Cross-interference (DBC) using the SF for each of the pairs, and determining the pair of $(P_T, L_T)$ of the transmit sparse array and $(P_R, L_R)$ of the receive sparse array based on the SF and the minimum value of the DBC.

* * * * *